US010759900B1

(12) United States Patent
Heifferon et al.

(10) Patent No.: US 10,759,900 B1
(45) Date of Patent: Sep. 1, 2020

(54) LIQUID CRYSTALLINE POLYESTER COMPOSITIONS AND METHODS

(71) Applicants: ExxonMobil Chemical Patents Inc., Baytown, TX (US); Virginia Tech Intellectual Properties, Inc., Blacksburg, VA (US)

(72) Inventors: Katherine V. Heifferon, Bear, DE (US); Timothy E. Long, Blacksburg, VA (US); S. Richard Turner, Blacksburg, VA (US); Yong Yang, Kingwood, TX (US); Syamal Tallury, Katy, TX (US); Ting Chen, Friendswood, TX (US); Javier Guzman, Porter, TX (US)

(73) Assignees: ExxonMobil Chemical Patents Inc., Baytown, TX (US); Virginia Tech Intellectual Property, Inc., Blacksburg, VA (US)

( * ) Notice: Subject to any disclaimer, the term of this patent is extended or adjusted under 35 U.S.C. 154(b) by 0 days.

(21) Appl. No.: 16/868,158

(22) Filed: May 6, 2020

Related U.S. Application Data

(63) Continuation-in-part of application No. PCT/US2018/049462, filed on Sep. 5, 2018.

(60) Provisional application No. 62/586,283, filed on Nov. 15, 2017.

(51) Int. Cl.
*C08G 63/191* (2006.01)
*C08G 63/185* (2006.01)
*C08G 63/80* (2006.01)
*C08G 63/06* (2006.01)
*C09K 19/38* (2006.01)

(52) U.S. Cl.
CPC .......... *C08G 63/191* (2013.01); *C08G 63/06* (2013.01); *C08G 63/185* (2013.01); *C08G 63/80* (2013.01); *C08G 2250/00* (2013.01); *C09K 19/38* (2013.01)

(58) Field of Classification Search
USPC .......... 528/176, 190, 192, 193, 194
See application file for complete search history.

(56) References Cited

U.S. PATENT DOCUMENTS

| | | | |
|---|---|---|---|
| 4,093,603 A | 6/1978 | Jackson, Jr. et al. | |
| 4,118,372 A | 10/1978 | Schaefgen | |
| 4,429,105 A | 1/1984 | Charbonneau | |
| 5,110,896 A | 5/1992 | Waggoner et al. | |
| 5,250,654 A | 10/1993 | Alms et al. | |
| 5,397,502 A | 3/1995 | Waggoner et al. | |
| 5,681,918 A | 10/1997 | Adams et al. | |
| 6,656,386 B2 | 12/2003 | Suenaga et al. | |
| 9,145,469 B2 | 9/2015 | Nair et al. | |
| 2006/0270773 A1 | 11/2006 | Hale et al. | |
| 2012/0241688 A1* | 9/2012 | Hara ................ | C08J 3/203 252/511 |
| 2020/0115546 A1* | 4/2020 | Hara ................ | C09K 11/00 |

OTHER PUBLICATIONS

PCT/US2018/049462 ISR and WO, dated Jan. 2, 2019.
Heifferon et al., Tailoring the glassy mesophase range of thermotropic polyesters through copolymerization of 4,4'-bibenzoate and kinked isomer; Polymer 163 (2019) 125-133.
Blumstein, Alexandre, Nematic Order in Polyesters with Flexible Moieties in the Main Chain, Polymer Journal, vol. 17, No. 1, pp. 277-288 (1985).
Deak, et al., Modification of Randomness by Transestertfication of Thermotropic Liquid Crystalline Copolyesters, Macromolecules 1999, 32, 3867-3874.

* cited by examiner

*Primary Examiner* — Terressa Boykin
(74) *Attorney, Agent, or Firm* — Daniel N. Lundeen; Lundeen & Lundeen PLLC

(57) ABSTRACT

Liquid crystalline hydroquinone-3,4'-biphenyl dicarboxylate polyesters, and methods of making them. The polyesters may be melt processed at a temperature below the thermal decomposition temperature and the isotropic temperature, and may form a liquid crystalline glass phase. The polyesters may be formed by polycondensation of hydroquinone or a hydroquinone derivative with 3,4'-biphenyl dicarboxylic acid.

27 Claims, 14 Drawing Sheets

LIQUID CRYSTALLINE POLYESTER COMPOSITIONS AND METHODS

CROSS REFERENCE TO RELATED APPLICATION

This application is a continuation in part of PCT US2018/049462, filed 5 Sep. 2018, which claims the benefit of and priority to provisional application U.S. 62/586,283, filed 15 Nov. 2017.

THE NAMES OF PARTIES TO A JOINT RESEARCH AGREEMENT

ExxonMobil Chemical Company, a division of Exxon-Mobil Corporation, and Virginia Polytechnic Institute and State University.

BACKGROUND OF THE INVENTION

There is a need in the art for new liquid crystalline polymers. Such polymers must have a working temperature for melt processing before the onset of degradation. Desirably, such polymers would also have good thermomechanical properties, high flame resistance, and good processability.

Liquid crystalline polyesters generally require linear aromatic monomers, e.g., 1,4-aromatic carbocyclic ring systems or 4,4'-biphenylenes, and/or comonomers to reduce the glass and isotropic transition temperatures below the degradation temperature of the polymer, and thus their syntheses can be complicated. For example, U.S. Pat. No. 4,118,372 discloses an anisotropic (co)polyester made from chlorohydroquinone diacetate, terephthalic acid, and 4,4'-bibenzoic acid.

Aromatic polyesters where the aromatic diacid component is isophthalic acid, terephthalic acid, or naphthalene dicarboxylic acid, have only produced semi-crystalline polymers or polymers with transition temperatures above the polymer degradation temperature, e.g., poly(p-phenylene terephthalate) and poly(p-hydroxybenzoic acid) melt above 600° C. These polymers typically require three, four or more comonomers to achieve heat resistance and a melting temperature range suitable for processing. For example, U.S. Pat. Nos. 5,110,896, 5,250,654, 5,397,502, and 6,656,386 disclose liquid crystalline polymers made from several comonomers derived from hydroquinone, 4,4'-dihydroxybiphenyl, terephthalic acid, 2,6-naphthalenedicarboxylic acid, 4,4'-bibenzoic acid, 4-hydroxybenzoic acid, isophthalic acid, 3,4'-bibenzoic acid, etc.

There is thus a need for new aromatic liquid crystalline polyesters that do not necessarily require the presence of comonomers, and/or that have a reduced or no comonomer content, to achieve heat resistance and/or a melting temperature range that may facilitate a commercial manufacturing process, and/or for a simplified method to make and/or process liquid crystalline polyesters.

SUMMARY OF THE INVENTION

This summary is provided to introduce a selection of concepts that are further described below in the detailed description. This summary is not intended to find key or essential features of the claimed subject matter, nor is it intended to be used as an aid in limiting the scope of the claimed subject matter.

We have discovered a melt processable liquid crystalline polyester that may consist of or consist essentially of hydroquinone as the dihydroxy component and 3,4'-biphenyl dicarboxylate as the diacid component.

In one aspect, the present disclosure provides a liquid crystalline polyester comprising: a dihydroxy component comprising at least about 80 mole percent of hydroquinone, based on the total moles of the dihydroxy component; a diacid component comprising at least about 80 mole percent of 3,4'-biphenyl dicarboxylate, based on the total moles of the diacid component. The polyester preferably has a flow temperature ($T_f$) as determined by ASTM D4065 at 1 Hz below an isotropic temperature ($T_i$) determined by DSC with a heat/cool/heat cycle (second heating) at a heating rate of 10° C./min and cooling rate of 100° C./min. The polyester may further comprise an optional hydroxy-carboxylic acid component in an amount up to 20 mole percent, based on the total moles of the diacid component and the hydroxy-carboxylic acid component.

In another aspect, the present disclosure provides a method comprising contacting a dihydroxy component comprising at least about 80 mole percent of hydroquinone or a hydroquinone derivative, with a diacid component comprising at least about 80 mole percent of 3,4'-biphenyl dicarboxylic acid (3,4'-BB), based on the total moles of the diacid component, under polycondensation conditions; forming a polyester comprising the dihydroxy component and the diacid components; and processing the polyester in a liquid crystalline glass phase.

DETAILED DESCRIPTION OF THE PREFERRED EMBODIMENTS

Figure 1A:
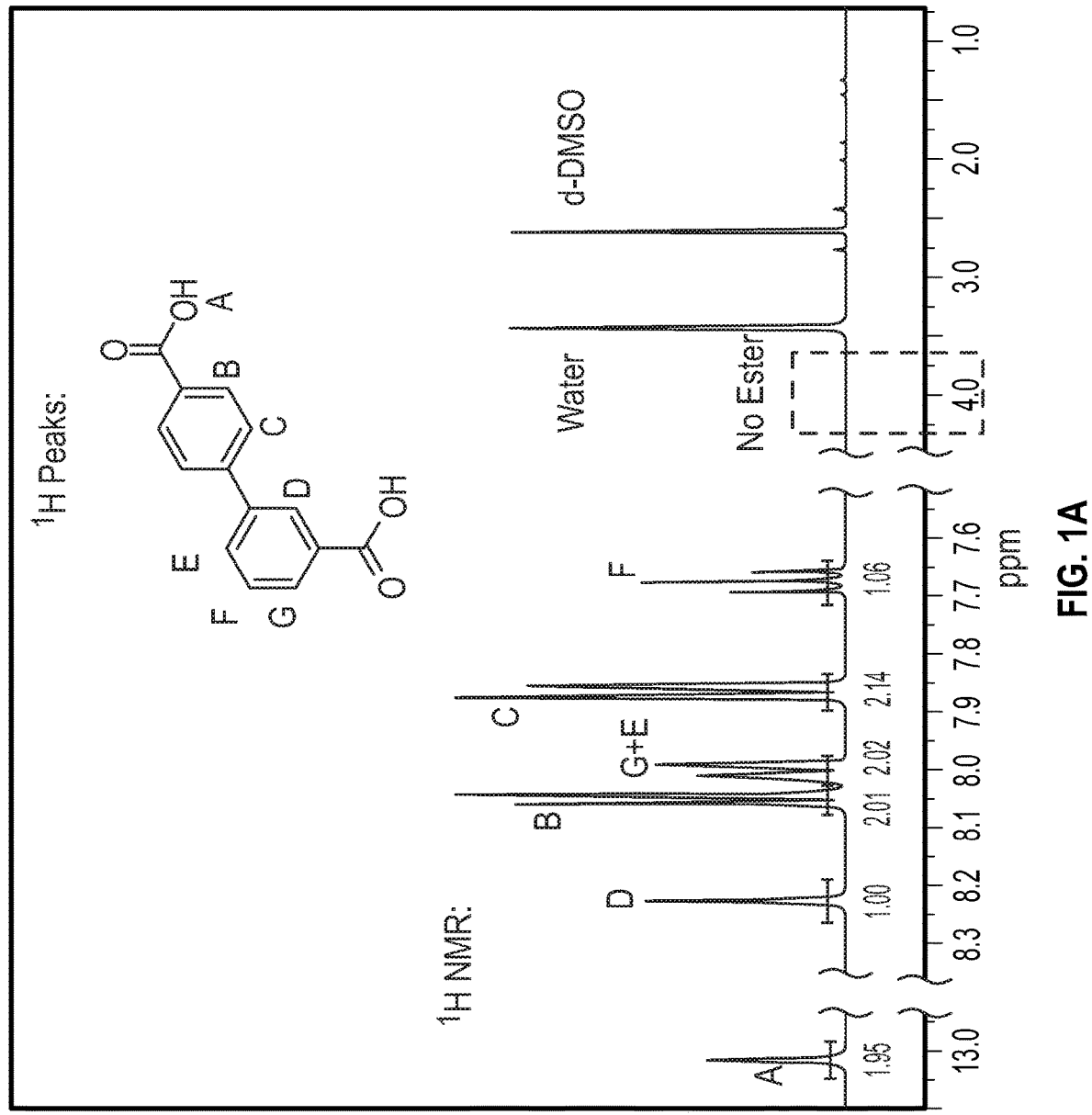
FIG. 1A is a $^1$H NMR spectrum and peak assignment for the hydrolyzed 3,4'-bibenzoate according to Example 1 below.

Throughout the entire specification, including the claims, the following terms shall have the indicated meanings.

The term "and/or" refers to both the inclusive "and" case and the exclusive "or" case, and such term is used herein for brevity. For example, a composition comprising "A and/or B" may comprise A alone, B alone, or both A and B.

The term "consisting essentially of" in reference to a composition is understood to mean that the composition can include additional compounds other than those specified, in such amounts to the extent that they do not substantially interfere with the essential function of the composition, or if no essential function is indicated, in any amount up to 5 percent by weight of the composition or component, preferably an amount up to 2 percent by weight of the composition or component, more preferably an amount up to 1 percent by weight of the composition or component.

For purposes herein, a "polymer" refers to a compound having two or more "mer" units, that is, a degree of polymerization of two or more, where the mer units can be of the same or different species. The term "polyester," as used herein, refers to a polymer comprised of residues derived from one or more polyfunctional acid moieties, collectively referred to herein as the "diacid component," in ester linkage with residues derived from one or more polyhydroxyl compounds, which may also be referred to herein as "polyols" and collectively as the "dihydroxy component." The term "repeating unit," also referred to as the "mer" units, as used herein with reference to polyesters refers to an organic structure having a diacid component residue and a dihydroxy component residue bonded through a carbonyloxy group, i.e., an ester linkage. Mole percentages of the diacid and dihydroxy components are expressed herein based on the total moles of the respective component, i.e., the polyesters comprise 100 mole percent of the polyfunctional acid component and 100 mole percent of the polyfunctional hydroxyl component.

As used herein, a "homopolymer" is a polymer having mer units or residues that are the same species, e.g., a homopolyester has ester residues derived from a single diacid and a single dihydroxy. A "copolymer" is a polymer having two or more different species of mer units or residues, e.g., a (co)polyester has more than one species of ester residues derived from more than one diacid and/or more than one dihydroxy. Unless otherwise indicated, reference to a polymer herein includes a copolymer, a terpolymer, or any polymer comprising a plurality of the same or different species of repeating units.

The term "residue," as used herein, means the organic structure of the monomer in its as-polymerized form as incorporated into a polymer, e.g., through a polycondensation and/or an esterification or transesterification reaction from the corresponding monomer. Throughout the specification and claims, reference to the monomer(s) in the polymer is understood to mean the corresponding as-polymerized form or residue of the respective monomer. For purposes herein, it is to be understood that by reference to a polyester comprising a diacid component and a dihydroxy component, the diacid and dihydroxy components are present in the polymer in the as-polymerized (as-condensed) form. For example, the diacid component is present in the polymer as dicarboxylate in alternating ester linkage with the dihydroxy component, yet the polyester may be described as being comprised of the dicarboxylic acid (or derivative) and the dihydroxy derivative, e.g., hydroquinone diacetate-3,4'-bibenzoate polyester ("poly(HQa-3,4'BB)") or hydroquinone dipivilate-3,4'-bibenzoate polyester ("poly (HQp-3,4'BB)"), where it is understood the acetyl or pivalyl ester groups in the starting material(s) are not generally present in the polyester, but may be present in minor or trivial amounts, e.g., as esters on the ends of some of the polymer chains.

The aforementioned dicarboxylic acid residues, e.g., 3,4'-biphenyl dicarboxylic acid residues, i.e., the dicarboxylate mer units, may be derived from a polyfunctional acid monomer or an ester producing equivalent thereof. Examples of ester producing equivalents of polyfunctional acids include one or more corresponding acid halide(s), ester(s), salts, the anhydride, or mixtures thereof. As used herein, therefore, the term "diacid" is intended to include polycarboxylic acids and any derivative of a polycarboxylic acid, including its associated acid halides, esters, half-esters, salts, half-salts, anhydrides, mixed anhydrides, or mixtures thereof, capable of forming esters useful in a reaction process with a dihydroxy to make polyesters.

As used herein, the term "birefringence" refers to the optical property of a material having a refractive index that depends on the polarization and propagation direction of light. Such materials are optically anisotropic and are said to be birefringent, or birefractive.

As used herein, the term "liquid crystal" (LC) refers to a state of matter having properties intermediate those of conventional liquids and solid crystals, in which the liquid crystal may flow like a liquid, but its molecules may be oriented in a crystal-like way that may be observed as birefringence.

As used herein, a "nematic mesophase" refers to a state of a liquid crystal in which rod-shaped molecules have no positional order, but are self-aligned to have their long axes oriented substantially parallel but not arranged in well-defined planes. As used herein "smectic mesophase" refers to a liquid crystal in which rod-shaped molecules are positionally ordered along one direction in well-defined layers, oriented either along the layer or tilted away from the layer.

As used herein, a "liquid crystalline polymer" is a polymer that is anisotropic and/or birefringent when viewed using polarized optical microscopy as described in U.S. Pat. No. 4,118,372, which is hereby incorporated herein by reference. The terms "liquid" and "crystalline" in "liquid crystalline polymer" refer to the LC type of crystalline-like ordering that is normally seen in liquid crystals, and do not necessarily connote that the polymer is in the liquid phase or has classic crystallinity, e.g., the polymer may exhibit anisotropy as either or both of liquid and solid phases, and the solid polymer may have any of crystalline, semicrystalline, liquid crystal, and amorphous morphologies.

As used herein, a "liquid crystalline glass" refers to a polymer that maintains liquid crystalline ordering, but does not generally form crystalline domains.

As used herein, the flow temperature ($T_{flow}$) is the temperature below which the fluid will not flow, and is determined experimentally as the onset point of the second storage modulus drop during a dynamic mechanical analysis (DMA) scan on a compression molded film with a thickness of 400 µm at a frequency of 1 Hz and a temperature increase ramp of 3° C./min. For purposes herein the flow temperature is determined according to ASTM D4065 at 1 Hz unless otherwise indicated.

As used herein, the thermal decomposition temperature ($T_{d,5\%}$) refers to the temperature in a thermogravimetric analysis at which 5 wt % of the sample is lost, and is determined according to ASTM D3850 by using a temperature ramp of 10° C./min under nitrogen.

As used herein, the heat of fusion $\Delta H_f$ (i.e., the specific heat at constant pressure-$\Delta Cp$), and the crystallinity of a polymer are determined using differential scanning calorimetry (DSC) according to standard laboratory practices. Isotropic temperature ($T_i$) and the heat of melting ($\Delta Hi$) refers to the temperature at which a material transitions between isotropic and anisotropic, and is determined via DSC by using a heat/cool/heat cycle (second heating) at a heating rate of 10° C./min and cooling rate of 100° C./min to obtain glass transition temperature ($T_g$) and isotropic temperature ($T_i$), which are determined consistent with ASTM D3418, unless otherwise indicated.

As used herein, the zero-shear melt viscosity ($\eta^*$) refers to the apparent viscosity at the indicated temperature, which for purposes herein is 340° C. unless otherwise indicated, and a frequency of 0.1 radians/second, and is determined by a frequency sweep study on 8 mm parallel plates under nitrogen at 1% and/or 1.25% strain. In case of a conflict, the zero-shear melt viscosity determined at 1% strain is used.

For purposes herein, the terms flexural modulus, flexural strength, tensile modulus, tensile strength, at maximum load and tensile strain to failure are used consistent with their well understood meaning in the art and are determined consistent with ASTM D638 unless otherwise specified.

Unless indicated otherwise, for purposes herein an essentially amorphous polymer is defined as a polymer that does not exhibit a substantially crystalline melting point, Tm, i.e., no discernable heat of fusion or a heat of fusion less than 5 J/g, when determined by a heat/cool/reheat differential scanning calorimetry (DSC) analysis from the second heating ramp by heating of the sample from 0° C. to 360° C. at a heating and cooling rate of 10° C./min. The sample is held for 3 min between heating and cooling scans. For purposes herein, an amorphous polymer may alternatively be indicated if injection molding of the polymer produces an article which is essentially clear, wherein the injection molding process used is known to produce articles having cloudy or opaque character upon injection molding of a semi-crystalline polymer having similar properties to the amorphous polymer.

For purposes herein, the melting temperature, crystallization temperature, glass transition temperature, etc., are determined by a heat/cool/reheat DSC analysis from the second heating ramp by heating of the sample from 0° C. to 360° C. at a heating and cooling rate of 100° C./min. The sample is held for 3 min between heating and cooling scans. Unless otherwise indicated, the heat of fusion, the amount of crystallization, and glass transition temperatures are determined at the midpoint of the respective endotherm or exotherm in the second heating ramp.

As used herein, "polycondensation" refers to the formation of a polymer by the linking together of molecules of one or more monomers with the subsequent releasing of water, or a similarly small molecule. As used herein, "acidolysis polycondensation" refers to a unique form of polycondensation in which a polycarboxylic acid in the free acid form is reacted with a poly-hydroxy compound or a derivative thereof, to form the resultant polyester linkages with the subsequent release of water or other leaving group. Acidolysis polycondensation also includes the reaction of a polycarboxylic acid in the free acid form with a polyhydroxy compound comprising a plurality of esterified phenolic substituents, e.g., hydroquinone dialkanoate (e.g., hydroquinone diacetate) with the subsequent formation of the phenol esterification acid; the esterified polyphenol is utilized as the polyhydroxy compound.

For purposes herein, a "dihydroxy compound" refers to a compound comprising a plurality of hydroxyl groups or functional groups derived from hydroxyl groups, e.g., esters, ethers, and the like. The term dihydroxy compound is not limited to poly alcohols, diols and derivatives thereof, but further includes polyphenolic compounds and esters thereof, e.g., hydroquinone and hydroquinone diacetate, respectively.

As used herein, "purifying" refers to removing contaminants. As used herein, "recrystallization" refers to the purification of a material by dissolution of the material in a solvent and precipitating the material from the solution, where the precipitated material has a higher purity than the starting material.

The following abbreviations and symbols are used herein: ASTM is ASTM International, formerly the American Society for Testing and Materials; 3,4'BB is 3,4'-biphenyl dicarboxylic acid; 4,4'BB is 4,4'-biphenyl dicarboxylic acid; $CDCl_3$ is deuterated chloroform; DCA is dichloroacetic acid; DMA is dynamic mechanical analysis; DMSO-d6 is deuterated dimethyl sulfoxide; DSC is differential scanning calorimetry; $\eta^*$ is zero shear melt viscosity; HDT is heat distortion temperature; HQ is hydroquinone; $HQ_a$ is hydroquinone diacetate; $HQ_p$ is hydroquinone dipivalate; IA is isophthalic acid; NDA is naphthalene dicarboxylic acid; POM is polarized optical microscopy; TA is terephthalic acid; $T_{d,5\%}$ is thermal decomposition temperature; TFA is trifluoroacetic acid; TFA-d is deuterated trifluoroacetic acid; the letter "d" prior to a chemical name also indicates a deuterated compound; $T_f$ is flow temperature; $T_g$ is glass transition temperature; TGA is thermogravimetric analysis; THF is tetrahydrofuran; $T_i$ is isotropic temperature; and $T_m$ is melting temperature.

Polyesters according to any embodiment herein may be prepared from reaction of a diacid component comprising at least about 80 mole percent of 3,4'BB or a derivative thereof, and a dihydroxy component comprising at least about 80 mole percent of hydroquinone or an ester-forming equivalent thereof, based on the total moles of the diacid component, under polycondensation conditions, which are incorporated into the polyester as their corresponding residues (i.e., in polymerized form). The polyesters useful in the present invention can contain an excess of the diacid component or an excess of the dihydroxy component to form corresponding diacid or dihydroxy oligomeric units, but preferably contain substantially equal molar proportions of diacid residues and dihydroxy residues such that the total moles of diacid/dihydroxy repeating units, of a diacid in which one of the two acid groups is esterified with one of the two hydroxyl groups of the dihydroxy, are equal to 100 mole percent.

In any embodiment of the invention, the liquid crystalline polyester may comprise at least about 80 mole percent of a dihydroxy component comprising hydroquinone; and a diacid component comprising at least about 80 mole percent of 3,4'-biphenyl dicarboxylate. The polyester can have a flow temperature ($T_f$) as determined by ASTM D4065 at 1 Hz below an isotropic temperature ($T_i$) determined by DSC with a heat/cool/heat cycle (second heating) at a heating rate of 10° C./min and cooling rate of 100° C./min. In any embodiment, the polyester may further exhibit birefringence and/or anisotropy, and may preferably comprise a liquid crystalline polyester comprising poly(hydroquinone-3,4'-bibenzoate). In any embodiment, the polyester may further comprise a nematic mesophase or a smectic mesophase.

In any embodiment, the polyester may further comprise a hydroxy-carboxylic acid component in an amount up to 20 mole percent, based on the total moles of the diacid component and the hydroxy-carboxylic acid component.

In any embodiment of the invention, the polyester may preferably consist essentially of, or consist of, hydroquinone and 3,4'-biphenyl dicarboxylate, e.g., the dihydroxy component can consist of hydroxyquinone and the diacid component can consist of 3,4-biphenyl dicarboxylate. In any embodiment, the polyester can be free of or essentially free of the hydroxy-carboxylic acid component.

In any embodiment of the invention, the dihydroxy component, the diacid component, or both the dihydroxy and diacid components, may further comprise one or more comonomers in an amount effective to: modify crystallinity, preferably increase crystallinity; modify heat of fusion ($\Delta H_f$), preferably increase heat of fusion; modify glass transition temperature ($T_g$), preferably increase $T_g$; modify thermal decomposition temperature ($T_{d,5\%}$), preferably increase $T_{d,5\%}$; modify flow temperature ($T_f$), preferably decrease $T_f$; modify isotropic temperature ($T_i$), preferably increase $T_i$; modify zero shear melt viscosity ($\eta^*$) at 340° C., preferably decrease $\eta^*$; or modify a combination thereof. Preferably, the one or more comonomers are aromatic.

In any embodiment of the invention: (a) the dihydroxy component may comprise one or more dihydroxy component comonomers, preferably in an amount up to 20 mole percent, preferably from 0.1 to 20 mole percent, more preferably from 0.1 to 10 mole percent, of the total moles of the dihydroxy component; (b) the diacid component may comprise one or more diacid component comonomers in an amount up to 20 mole percent, preferably from 0.1 to 20 mole percent, more preferably from 0.1 to 10 mole percent, of the total moles of the diacid component, based on the total moles of the diacid component; (c) the polyester may comprise a hydroxy-carboxylic acid comonomer in an amount up to 20 mole percent, preferably from 0.1 to 20 mole percent, more preferably from 0.1 to 10 mole percent, of the total moles of the diacid component and the hydroxy-carboxylic acid comonomer; or (d) any combination thereof. Preferably, the one or more comonomers are aromatic.

In any embodiment of the invention: (a) the dihydroxy component may further comprise up to 20 mole percent, preferably from 0.1 to 20 mole percent, more preferably from 0.1 to 10 mole percent, of the total moles of the dihydroxy component, of a dihydroxy comonomer, preferably an aromatic dihydroxy comonomer, preferably selected from: resorcinol, 4,4-dihydroxybiphenyl, and combinations thereof, preferably wherein hydroquinone comprises at least 80 mole percent of the dihydroxy component based on the total moles of the dihydroxy component; and/or (b) the diacid component may further comprise up to 20 mole percent, preferably from 0.1 to 20 mole percent, more preferably from 0.1 to 10 mole percent, of the total moles of the diacid component, of a diacid comonomer, preferably an aromatic diacid comonomer, preferably selected from: terephthalic acid (TA), naphthalene dicarboxylic acid (NDA), 4,4'-biphenyl dicarboxylate (4,4'BB), hydroxybenzoic acid (HBA), isophthalic acid (IA), and combinations thereof, preferably wherein 3,4'-biphenyl dicarboxylate comprises at least 80 mole percent of the diacid component, based on the total moles of the diacid component.

In any embodiment of the invention: (a) the diacid component may further comprise up to 20 mole percent, preferably from 0.1 to 20 mole percent, preferably from 0.1 to 10 mole percent, of the total moles of the diacid component of one or more diacid comonomers to modify $T_g$, preferably to increase $T_g$, preferably wherein the one or more diacid comonomers comprises isophthalic acid (IA), preferably wherein 3,4'-biphenyl dicarboxylate comprises at least 80 mole percent of the diacid component, based on the total moles of the diacid component; or (b) the dihydroxy component may further comprise up to 20 mole percent, preferably from 0.1 to 20 mole percent, preferably from 0.1 to 10 mole percent, of the total moles of the dihydroxy component of one or more dihydroxy comonomers to modify, preferably increase, $T_g$, preferably wherein the one or more dihydroxy comonomers comprises an aromatic dihydroxy comonomer, preferably resorcinol, preferably wherein hydroquinone comprises at least 80 mole percent of the dihydroxy component based on the total moles of the dihydroxy component; or (c) a combination thereof; preferably wherein the polyester comprises a nematic phase, an amorphous morphology phase, or a combination thereof.

In any embodiment of the invention: (a) the diacid component may further comprise up to 20 mole percent, preferably from 0.1 to 20 mole percent, preferably from 0.1 to 10 mole percent, of the total moles of the diacid component of one or more diacid comonomers to modify crystallinity of the polyester, preferably to increase heat of fusion ($\Delta H_f$), preferably wherein the one or more diacid comonomers is selected from: terephthalic acid (TA), naphthalene dicarboxylic acid (NDA), 4,4'-biphenyl dicarboxylate (4,4'BB), hydroxybenzoic acid (HBA), and combinations thereof, preferably wherein 3,4'-biphenyl dicarboxylate comprises at least 80 mole percent of the diacid component, based on the total moles of the diacid component; or (b) wherein the dihydroxy component may further comprise up to 20 mole percent of the total moles of the dihydroxy component of one or more dihydroxy comonomers to modify crystallinity of the polyester, preferably to increase heat of fusion ($\Delta H_f$), preferably wherein the one or more dihydroxy comonomers comprises an aromatic dihydroxy, preferably 4,4-dihydroxybiphenyl, preferably wherein hydroquinone comprises at least 80 mole percent of the dihydroxy component based on the total moles of the dihydroxy component; or (c) a combination thereof; preferably wherein the polyester comprises a smectic phase, a semicrystalline morphology, or a combination thereof.

In any embodiment, the one or more aromatic dihydroxy comonomers is selected from: resorcinol, 4,4-dihydroxybiphenyl, and combinations thereof; the one or more aromatic diacid comonomers is selected from: terephthalic acid (TA), naphthalene dicarboxylic acid (NDA), 4,4'-biphenyl dicarboxylate (4,4'BB), isophthalic acid (IA), and combinations thereof; and/or the hydroxy-carboxylic acid comonomer, if present, is p-hydroxy benzoic acid.

In any embodiment of the invention, the polyester may further exhibit a flow temperature ($T_f$) less than a thermal decomposition temperature ($T_{d,5\%}$), and/or an isotropic temperature ($T_i$) less than $T_{d,5\%}$.

In any embodiment of the invention, the polyester may further exhibit: (a) a thermal decomposition temperature ($T_{d,5\%}$) of about 400° C. or more, preferably about 450° C. or more, about 475° C. or more, about 480° C. or more, about 475° C. to about 495° C., about 480° C. to about 490° C., or about 484° C. to about 487° C.; or (b) a flow temperature ($T_f$) of about 400° C. or less, preferably about 350° C. or less, about 300° C. to about 350° C., about 310° C. to about 340° C., about 320° C. to about 330° C., about 322° C. to about 327° C., or about 324° C. to about 325° C.; or (c) an isotropic temperature ($T_i$) of about 400° C. or less, preferably about 350° C. or less, about 300° C. to about 350° C., about 310° C. to about 340° C., about 320° C. to about 330° C., about 322° C. to about 327° C., or about 324° C. to about 325° C.; or (d) a glass transition temperature ($T_g$) of about 220° C. or less, preferably about 175° C. to about 210° C., about 180° C. to about 205° C., about 182° C. to about 200° C., about 184° C. to about 198° C., about 182° C. to about 186° C., about 184° C., about 196° C. to about 200° C., or about 198° C.; or (e) a zero shear melt viscosity ($\eta^*$) at 340° C. of at least about 50,000 Pa-s, preferably at least about 75,000 Pa-s, at least about 100,000 Pa-s, at least about 1,000,000 Pa-s, at least about 2,000,000 Pa-s, about 50,000 Pa-s to about 5,000,000 Pa-s, about 75,000 Pa-s to about 3,500,000 Pa-s, about 100,000 Pa-s to about 2,500,000 Pa-s, about 100,000 Pa-s, or about 2,500,000 Pa-s; or a combination of any or all thereof.

In any embodiment of the invention, a method may comprise contacting a dihydroxy component comprising at least about 80 mole percent of hydroquinone or an ester forming hydroquinone derivative, with a diacid component comprising at least about 80 mole percent of 3,4'-biphenyl dicarboxylic acid (3,4'-BB) or an ester-forming derivative of 3,4'-BB, and optionally with a hydroxy-carboxylic acid component in an amount up to 20 mole percent, based on the total moles of the diacid component and the hydroxy-carboxylic acid component, under polycondensation conditions; forming a polyester comprising the dihydroxy and diacid components and any hydroxy-carboxylic acid component; and processing the polyester in a liquid crystalline glass phase. Generally, the method may be used to form the polyester of any embodiment described herein.

In any embodiment of the method, the polyester may preferably consist essentially of, or consist of, hydroquinone and 3,4'-biphenyl dicarboxylate, e.g., the dihydroxy component can consist of hydroxyquinone and the diacid component can consist of 3,4-biphenyl dicarboxylate. In any embodiment of the method, the polyester can be free of or essentially free of the hydroxy-carboxylic acid component.

In any embodiment of the method, the dihydroxy component may comprise, consist essentially of, or preferably consist of the hydroquinone derivative, preferably wherein the hydroquinone derivative comprises a carboxylic acid or anhydride addition diester, preferably wherein the carboxylic acid comprises from 1 to 6 carbon atoms, preferably from 1 to 4 carbon atoms, or wherein the carboxylic acid anhydride comprises from 2 to 12 carbon atoms, preferably 2 to 8 carbon atoms, preferably wherein the hydroquinone derivative is hydroquinone alkanoate, preferably hydroquinone diacetate, hydroquinone dipivalate, or a combination thereof. In any embodiment of the method the dihydroxy component may comprise, consist essentially of, or consist of the hydroquinone derivative, preferably wherein the hydroquinone derivative comprises the reaction product of a hydroquinone with a carboxylic acid, preferably an alkyl carboxylic acid comprising from 1 to 6 carbon atoms, preferably an alkyl carboxylic acid comprising 1 to 4 carbon atoms, or an anhydride comprising from 2 to 14 carbon atoms, preferably 2 to 8 carbon atoms, to form the hydroquinone diester, preferably wherein the hydroquinone diester is hydroquinone dialkanoate, preferably hydroquinone diacetate, hydroquinone dipivalate, or a combination thereof.

In any embodiment of the method, the diacid component may comprise, consist essentially of, or preferably consist of 3,4'-BB, preferably in the free acid form.

In any embodiment of the method, the dihydroxy component, the diacid component, or both the dihydroxy and diacid components, may further comprise one or more comonomers in an amount effective to: modify crystallinity, preferably increase crystallinity; modify heat of fusion ($\Delta H_f$), preferably increase heat of fusion; modify glass transition temperature ($T_g$), preferably increase $T_g$; modify thermal decomposition temperature ($T_{d,5\%}$), preferably increase $T_{d,5\%}$; modify flow temperature ($T_f$), preferably decrease $T_f$; modify isotropic temperature ($T_i$), preferably increase $T_i$; modify zero shear melt viscosity ($\eta^*$) at 340° C., preferably decrease $\eta^*$; or modify a combination thereof of the polyester formed. Preferably, the one or more comonomers are aromatic.

In any embodiment of the method: (a) the dihydroxy component may comprise one or more dihydroxy component comonomers, preferably in an amount up to 20 mole percent, preferably from 0.1 to 20 mole percent, more preferably from 0.1 to 10 mole percent, of the total moles of the dihydroxy component, preferably wherein hydroquinone or a derivative thereof comprises at least 80 mole percent of the dihydroxy component based on the total moles of the dihydroxy component; (b) the diacid component may comprise one or more diacid component comonomers in an amount up to 20 mole percent, preferably from 0.1 to 20 mole percent, more preferably from 0.1 to 10 mole percent, of the total moles of the diacid component, preferably wherein 3,4'-biphenyl dicarboxylate comprises at least 80 mole percent of the diacid component, based on the total moles of the diacid component; or (c) a combination thereof. Preferably, the one or more comonomers are aromatic.

In any embodiment of the method: (a) the dihydroxy component further comprises up to 20 mole percent, preferably from 0.1 to 20 mole percent, more preferably from 0.1 to 10 mole percent, of the total moles of the dihydroxy component, of a dihydroxy comonomer, preferably an aromatic dihydroxy comonomer, preferably selected from: resorcinol, 4,4-dihydroxybiphenyl, and derivatives and combinations thereof; or (b) the diacid component may further comprise up to 20 mole percent, preferably from 0.1 to 20 mole percent, more preferably from 0.1 to 10 mole percent, of the total moles of the diacid component, of a diacid comonomer, preferably an aromatic diacid comonomer, preferably selected from: terephthalic acid (TA), naphthalene dicarboxylic acid (NDA), 4,4'-biphenyl dicarboxylate (4,4'BB), hydroxybenzoic acid (HBA), isophthalic acid (IA), and combinations thereof.

In any embodiment of the method: (a) the diacid component may further comprise up to 20 mole percent, preferably from 0.1 to 20 mole percent, preferably from 0.1 to 10 mole percent, of the total moles of the diacid component of one or more diacid comonomers to modify $T_g$, preferably to increase $T_g$, preferably wherein the one or more diacid comonomers comprises isophthalic acid (IA), preferably wherein 3,4'-biphenyl dicarboxylate comprises at least 80 mole percent of the diacid component, based on the total moles of the diacid component; or (b) the dihydroxy component may further comprise up to 20 mole percent, preferably from 0.1 to 20 mole percent, preferably from 0.1 to 10 mole percent, of the total moles of the dihydroxy component of one or more dihydroxy comonomers to modify, preferably increase, $T_g$, of the polyester formed, preferably wherein the one or more dihydroxy comonomers comprises an aromatic dihydroxy comonomer, preferably resorcinol or a derivative thereof, preferably wherein hydroquinone or a derivative thereof comprises at least 80 mole percent of the dihydroxy component based on the total moles of the dihydroxy component; or (c) a combination thereof; preferably wherein the polyester comprises a nematic phase, an amorphous morphology phase, or a combination thereof.

In any embodiment of the method: (a) the diacid component may further comprise up to 20 mole percent, preferably from 0.1 to 20 mole percent, preferably from 0.1 to 10 mole percent, of the total moles of the diacid component of one or more diacid comonomers to modify crystallinity of the polyester formed, preferably to increase heat of fusion ($\Delta H_f$), preferably wherein the one or more diacid comonomers is selected from: terephthalic acid (TA), naphthalene dicarboxylic acid (NDA), 4,4'-biphenyl dicarboxylate (4,4'BB), hydroxybenzoic acid (HBA), and combinations thereof, preferably wherein 3,4'-biphenyl dicarboxylate comprises at least 80 mole percent of the diacid component, based on the total moles of the diacid component; or (b) wherein the dihydroxy component further comprises up to 20 mole percent of the total moles of the dihydroxy component of one or more dihydroxy comonomers to modify crystallinity of the polyester formed, preferably to increase heat of fusion ($\Delta H_f$), preferably wherein the one or more dihydroxy comonomers comprises an aromatic dihydroxy, preferably 4,4-dihydroxybiphenyl or a derivative thereof, preferably wherein hydroquinone or a derivative thereof comprises at least 80 mole percent of the dihydroxy component based on the total moles of the dihydroxy component; or (c) a combination thereof; preferably wherein the polyester formed comprises a smectic phase, a semicrystalline morphology, or a combination thereof.

In any embodiment of the method, the one or more comonomers may be aromatic, cycloaliphatic, non-cyclic aliphatic, or a combination thereof, preferably aromatic.

In any embodiment of the method, the polyester formation may be by acidolysis polycondensation.

In any embodiment of the invention, the method may further comprise hydrolyzing a 3,4'-bibenzoate diester to form the 3,4'-BB, followed by acidification to form the 3,4'-BB free acid, preferably wherein the diester comprises dialkyl 3,4'-bibenzoate, more preferably dimethyl 3,4'-bibenzoate. Preferably, the hydrolysis comprises refluxing the 3,4'-bibenzoate diester in an alkaline solvent, preferably aqueous sodium hydroxide, followed by acidification with a mineral acid, e.g., HCl.

In any embodiment of the invention, the method may further comprise esterifying hydroquinone with the ester-forming hydrocarbyl, preferably the carboxylic acid, carboxylic acid anhydride, or combination thereof, more preferably the acetic acid, acetic anhydride, pivalic acid, pivalic anhydride, or combination thereof, to form the hydroquinone derivative comprising hydroquinone diester. Esterification may be accomplished by adding an ester-forming hydrocarbyl, such as acetic anhydride to the hydroquinone and/or other monomers. Acetylation, for example, is generally achieved with an excess of from about 1 to about 10 mole percent of acetic anhydride, usually with an esterification catalyst, at temperatures of from about 90° C. to 150° C., optionally with reflux to retain residual acetic anhydride in the reaction. Acetylation may occur in a separate reactor vessel, or it may occur in situ within the polymerization reactor vessel. The esterification catalyst may be the same or different as the polycondensation catalyst.

In any embodiment of the invention, the method may further comprise purifying the hydroquinone derivative, preferably by recrystallization.

In any embodiment of the invention, the method may further comprise melt processing the polyester. Preferably, the method further comprises cooling the polyester from the melt to form a liquid crystalline glass phase, preferably a nematic mesophase or a smectic mesophase. In any embodiment, the method may further comprise forming the polyester into a shaped article, preferably a fiber, a nonwoven fabric, a film, or a molded article.

In any embodiment of the present invention, the polyesters can have a number average molecular weight of equal to or greater than about 5,000 g/mol (or equal to or greater than 8,000, or equal to or greater than 10,000, or equal to or greater than 12,000, or equal to or greater than 15,000, or equal to or greater than 20,000, or equal to or greater than 30,000, or equal to or greater than 40,000, or equal to or greater than 50,000 g/mol); and/or a polydispersity of greater than 1.75 up to 3.5 (or from 1.8 up to 3, or from 1.8 to 2.5, or from 1.9 to 2.5, or about 2.0) where Mn and polydispersity are determined by GPC or calculated from the inherent viscosity. In the event of a conflict, the calculation from inherent viscosity shall control. In any embodiment of the invention, the polyester preferably exhibits an inherent viscosity equal to or greater than about 0.5 dL/g, or equal to or greater than 0.7 dL/g, or equal to or greater than 0.8 dL/g; and/or less than or equal to about 1 dL/g, or less than or equal to about 0.9 dL/g.

In any embodiment, the polyesters preferably have a glass transition temperature equal to or greater than about 160° C., or greater than about 170° C., or greater than about 180° C., or greater than about 190° C., or about 194° C.

Often, the polyesters can exhibit an essentially amorphous morphology, e.g., the polymer does not exhibit a measurable crystallization temperature $T_c$ and/or does not exhibit a discernable melting temperature $T_m$.

Often, the polyesters can exhibit a semicrystalline morphology. In any embodiment, the polymer preferably comprises relative amounts of 3,4'-biphenyl dicarboxylate and diacid comonomer(s) sufficient to produce a melting point peak, a crystallization point peak, or both. When the polyester is semi-crystalline, it preferably has a melting point of less than the $T_{d,5\%}$, preferably a melting point of about 320° C. or less.

Often, the polyester copolymer can exhibit less than or equal to about 20 weight percent crystallinity, or less than or equal to about 10 weight percent crystallinity, or less than or equal to about 5 weight percent crystallinity, or less than or equal to about 1 weight percent crystallinity, determined by DSC analysis from a second heating ramp at a heating rate of 10° C./min.

It is expected that the polyesters according to the present invention have a flexural modulus greater than 4800 MPa when determined according to ASTM D638; and/or a flexural strength greater than 170 MPa when determined according to ASTM D638; and/or a tensile modulus of greater than 4700 MPa, when determined according to ASTM D638; and/or a tensile strength at maximum load of greater than 70 MPa, when determined according to ASTM D638; and/or a tensile strain to failure of greater than 1.8%.

In any embodiment of the invention, the polyesters may be prepared by melt polymerization techniques including transesterification and polycondensation, in batch, semi-batch, or continuous processes. The polyesters are preferably prepared in a reactor equipped with a stirrer, an inert gas (e.g., nitrogen) inlet, a thermocouple, a distillation column connected to a water-cooled condenser, a water separator, and a vacuum connection tube. For example, the equipment and procedures disclosed in U.S. Pat. Nos. 4,093,603 and 5,681,918, incorporated by reference herein, may be adapted for implementing the present invention.

In any embodiment, polycondensation processes may include melt phase processes conducted with the introduction of an inert gas stream, such as nitrogen, to shift the equilibrium and advance to high molecular weight and/or vacuum melt phase polycondensation, preferably acid hydrolysis polycondensation, at temperatures above about 150° C., preferably above about 300° C., and pressures below about 130 Pa (1 mm Hg). The esterification conditions can generally include a temperature which is gradually increased from about 300° C. in the initial reaction steps up to about 330 to 360° C. in the later steps, initially under normal pressure, then, when necessary, under reduced pressure at the end of each step, while maintaining these operating conditions until a polyester with the desired properties is obtained. The acid hydrolysis polycondensation is preferably conducted without catalysts or stabilizers, but if desired the esterification conditions may include an optional esterification catalyst, preferably in an amount from about 0.05 to 1.5 percent by weight of the reactants; optional stabilizers, such as, for example, phenolic antioxidants such as IRGANOX 1010 or phosphonite- and phosphite-type stabilizers such as tributylphosphite, preferably in an amount from 0 to 1 percent by weight of the reactants. If desired, the degree of esterification may be monitored by measuring the amount of hydroquinone esterification acid (e.g., acetic acid or pivalic acid) formed and the properties of the polyester, for example, viscosity, hydroxyl number, acid number, and so on. In embodiments, the catalyst comprises from 0.05 to 1.5 wt % of an alkyl acid salt, preferably a Group I salt of an alkyl acid comprising from 1 to 6 carbon atoms, preferably sodium acetate, potassium acetate, sodium pivalate potassium pivalate, or a combination thereof.

In general, the polyesters may include conventional additives including pigments, colorants, stabilizers, antioxidants, extrusion aids, reheat agents, slip agents, carbon black, flame retardants, and mixtures thereof. In any embodiment, the polyester may be combined or blended with one or more modifiers and/or blend polymers including polyamides; e.g., NYLON 6,6® (DuPont), poly(ether-imides), polyphenylene oxides, e.g., poly(2,6-dimethylphenylene oxide), poly(phenylene oxide)/polystyrene blends; e.g., NORYL® (SABIC Innovative Plastics), other polyesters, polyphenylene sulfides, polyphenylene sulfide/sulfones, poly(ester-carbonates), polycarbonates; e.g., LEXAN® (SABIC Innovative Plastics), polysulfones, polysulfone ethers, poly(ether-ketones), combinations thereof, and the like.

Any of the polyesters and compositions described herein may be used in the preparation of molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. The polyester compositions described above may also be used in the preparation of nonwoven fabrics and fibers. In any embodiment, a shaped article such as an extruded profile or an extruded or injection molded article can comprise one or more polyesters according to one or more embodiments disclosed herein. Accordingly, in any embodiment, polyesters according to the instant invention can generally be molded and extruded using conventional melt processing techniques to produce a shaped article. Such articles may exhibit birefringence. Such articles may be transparent. The shaped articles manufactured from the polyesters disclosed herein generally exhibit birefringence and/or other improved properties as shown in the examples below.

Shaped articles comprising any embodiment of the polymers disclosed herein may generally be produced using thermoplastic processing procedures such as injection molding, calendaring, extrusion, blow molding, extrusion blow molding, rotational molding, and so on. The amorphous and/or semicrystalline (co)polyesters of the present invention preferably exhibit improved stability at various melt temperatures. In the conversion of the polyesters into shaped articles, the carboxylic acid content of polyesters according to the present invention may often be reduced to less than about 0.02 percent prior to melt processing.

EMBODIMENTS

The present invention provides the following embodiments:

1. A polyester comprising:
a dihydroxy component comprising at least about 80 mole percent of hydroquinone, based on the total moles of the dihydroxy component; and
a diacid component comprising at least about 80 mole percent of 3,4'-biphenyl dicarboxylate, based on the total moles of the diacid component;
an optional hydroxy-carboxylic acid component in an amount up to 20 mole percent, based on the total moles of the diacid component and the hydroxy-carboxylic acid component.

2. The polyester of embodiment 1, wherein the polyester is a liquid crystalline polyester having a flow temperature ($T_f$) as determined by ASTM D4065 at 1 Hz below an isotropic temperature ($T_i$) determined by DSC with a heat/cool/heat cycle (second heating) at a heating rate of 10° C./min and cooling rate of 100° C./min.

3. The polyester of embodiment 1 or embodiment 2, wherein the polyester exhibits birefringence and/or anisotropy, preferably wherein the polyester comprises a liquid crystalline glass phase comprising poly(hydroquinone-3,4'-biphenyl dicarboxylate), or more preferably a nematic mesophase or a smectic mesophase comprising poly(hydroquinone-3,4'-biphenyl dicarboxylate).

4. The polyester of embodiment 1 or embodiment 2, consisting essentially of or consisting of hydroquinone and 3,4'-biphenyl dicarboxylate.

5. The polyester of any preceding embodiment, wherein the dihydroxy component consists of hydroquinone, and the diacid component consists of 3,4'-biphenyl dicarboxylate.

6. The polyester of any preceding embodiment, wherein the polyester is free of the hydroxy-carboxylic acid component.

7. The polyester of any preceding embodiment, further comprising one or more comonomers in an amount effective to modify: crystallinity as determined by ASTM D3418; heat of fusion ($\Delta H_f$) as determined by ASTM D341; glass transition temperature ($T_g$), as determined by ASTM D3418; thermal decomposition temperature ($T_{d,5\%}$) as determined by ASTM D3850 using a temperature ramp of 10° C./min under nitrogen; the $T_f$; the $T_i$; zero shear melt viscosity ($\eta^*$) determined at 340° C. at a frequency of 0.1 radians/second, by frequency sweep on 8 mm parallel plates under nitrogen at 1% strain; or a combination thereof.

8. The polyester of embodiment 7, further comprising one or more of the following: wherein the dihydroxy component comprises one or more aromatic dihydroxy component comonomers in an amount up to 20 mole percent, based on the total moles of the dihydroxy component; wherein the diacid component comprises one or more aromatic diacid component comonomers in an amount up to 20 mole percent, based on the total moles of the diacid component; wherein the polyester comprises a hydroxy-carboxylic acid comonomer in an amount up to 20 mole percent, based on the total moles of the diacid component and the hydroxy-acid comonomer.

9. The polyester of embodiment 8, further comprising one or more of the following: wherein the one or more aromatic dihydroxy comonomers is selected from: resorcinol, 4,4-dihydroxybiphenyl, and combinations thereof;
wherein the one or more aromatic diacid comonomers is selected from: terephthalic acid (TA), naphthalene dicarboxylic acid (NDA), 4,4'-biphenyl dicarboxylate (4,4'BB), isophthalic acid (IA), and combinations thereof;
wherein the hydroxy-carboxylic acid comonomer is p-hydroxy benzoic acid.

10. The polyester of any preceding embodiment, wherein the $T_i$ is less than the thermal decomposition temperature ($T_{d,5\%}$) as determined by ASTM D3850 using a temperature ramp of 10° C./min under nitrogen.

11. The polyester of any preceding embodiment, wherein the polyester exhibits one or more of the following:
a thermal decomposition temperature ($T_{d,5\%}$) as determined by ASTM D3850 using a temperature ramp of 10° C./min under nitrogen, of about 400° C. or more;
the $T_f$ is about 350° C. or less;
the $T_i$ is about 350° C. or less;
a glass transition temperature ($T_g$) as determined by ASTM D3418, of about 220° C. or less;
a zero-shear melt viscosity ($\eta^*$) determined at 340° C. at a frequency of 0.1 radians/second, by frequency sweep on 8 mm parallel plates under nitrogen at 1.25% strain, of at least about 50,000 Pa-s.

12. The polyester of any preceding embodiment, further comprising one or more or all of the following:
wherein the dihydroxy component, the diacid component, or both the dihydroxy and diacid components further comprise: one or more comonomers in an amount effective to modify (preferably increase) crystallinity, as determined by ASTM D3418,
wherein the dihydroxy component, the diacid component, or both the dihydroxy and diacid components further comprise: one or more comonomers in an amount effective to modify (preferably increase) heat of fusion ($\Delta H_f$) as determined by ASTM D341,
wherein the dihydroxy component, the diacid component, or both the dihydroxy and diacid components further comprise: one or more comonomers in an amount effective to modify (preferably increase) glass transition temperature ($T_g$), as determined by ASTM D3418,
wherein the dihydroxy component, the diacid component, or both the dihydroxy and diacid components further comprise: one or more comonomers in an amount effective to modify (preferably increase) thermal decomposition temperature ($T_{d,5\%}$) as determined by ASTM D3850 using a temperature ramp of 10° C./min under nitrogen,
wherein the dihydroxy component, the diacid component, or both the dihydroxy and diacid components further comprise: one or more comonomers in an amount effective to modify (preferably decrease) flow temperature (Tf) as determined by ASTM D4065 at 1 Hz,
wherein the dihydroxy component, the diacid component, or both the dihydroxy and diacid components further comprise: one or more comonomers in an amount effective to modify (preferably decrease) isotropic temperature (Ti) as determined by ASTM D3418, and/or wherein the dihydroxy component, the diacid component, or both the dihydroxy and diacid components further comprise: one or more comonomers in an amount effective to modify (preferably decrease) zero shear melt viscosity ($\eta^*$) determined at 340° C. at a frequency of 0.1 radians/second, by frequency sweep on 8 mm parallel plates under nitrogen at 1% strain.

13. The polyester of embodiment 12 wherein the one or more comonomers are aromatic.

14. The polyester of any preceding embodiment, further comprising wherein (a) the dihydroxy component comprises one or more dihydroxy component comonomers in an amount up to 20 mole percent, preferably from 0.1 to 20 mole percent, more preferably from 0.1 to 10 mole percent, of the total moles of the dihydroxy component, preferably wherein hydroquinone comprises at least 80 mole percent of the dihydroxy component based on the total moles of the dihydroxy component; (b) the diacid component comprises one or more diacid component comonomers in an amount up to 20 mole percent, preferably from 0.1 to 20 mole percent, more preferably from 0.1 to 10 mole percent, of the total moles of the diacid component, preferably wherein 3,4'-biphenyl dicarboxylate comprises at least 80 mole percent of the diacid component based on the total moles of the diacid component; or (c) a combination thereof; preferably wherein the one or more comonomers are aromatic.

15. The polyester of any preceding embodiment, further comprising one or both of the following:
wherein the dihydroxy component further comprises up to 20 mole percent, preferably from 0.1 to 20 mole percent, more preferably from 0.1 to 10 mole percent, of the total moles of the dihydroxy component, of a dihydroxy comonomer, preferably an aromatic dihydroxy comonomer, preferably selected from: resorcinol, 4,4-dihydroxybiphenyl, and combinations thereof, preferably wherein hydroquinone comprises at least 80 mole percent of the dihydroxy component based on the total moles of the dihydroxy component; and/or
wherein the diacid component further comprises up to 20 mole percent, preferably from 0.1 to 20 mole percent, more preferably from 0.1 to 10 mole percent, of the total moles of the diacid component, of a diacid comonomer, preferably an aromatic diacid comonomer, preferably selected from: terephthalic acid (TA), naphthalene dicarboxylic acid (NDA), 4,4'-biphenyl dicarboxylate (4,4'BB), hydroxybenzoic acid (HBA), isophthalic acid (IA), and combinations thereof, preferably wherein 3,4'-biphenyl dicarboxylate comprises at least 80 mole percent of the diacid component based on the total moles of the diacid component.

16. The polyester of any preceding embodiment, further comprising one or both of the following:
wherein the diacid component further comprises up to 20 mole percent, preferably from 0.1 to 20 mole percent, preferably from 0.1 to 10 mole percent, of the total moles of the diacid component of one or more diacid comonomers to modify (preferably increase) glass transition temperature ($T_g$) as determined by ASTM D3418, preferably wherein the one or more diacid comonomers comprises isophthalic acid (IA), preferably wherein 3,4'-biphenyl dicarboxylate comprises at least 80 mole percent of the diacid component based on the total moles of the diacid component; and/or
wherein the dihydroxy component further comprises up to 20 mole percent, preferably from 0.1 to 20 mole percent, of the total moles of the dihydroxy component of one or more dihydroxy comonomers to modify (preferably increase) glass transition temperature ($T_g$) as determined by ASTM D3418, preferably wherein the one or more dihydroxy comonomers comprises an aromatic dihydroxy comonomer, preferably resorcinol, preferably wherein hydroquinone comprises at least 80 mole percent of the dihydroxy component based on the total moles of the dihydroxy component.

17. The polyester of embodiment 16 wherein the polyester comprises a nematic phase, an amorphous morphology phase, or a combination thereof.

18. The polyester of any preceding embodiment, further comprising one or both of the following:
wherein the diacid component further comprises up to 20 mole percent, preferably from 0.1 to 20 mole percent, preferably from 0.1 to 10 mole percent, of the total moles of the diacid component of one or more diacid comonomers to modify crystallinity of the polyester, preferably to increase heat of fusion ($\Delta H_f$) as determined by ASTM D3418, preferably wherein the one or more diacid comonomers is selected from: terephthalic acid (TA), naphthalene dicarboxylic acid (NDA), 4,4'-biphenyl dicarboxylate (4,4'BB), hydroxybenzoic acid (HBA), and combinations thereof, preferably wherein 3,4'-biphenyl dicarboxylate comprises at least 80 mole percent of the diacid component based on the total moles of the diacid component; and/or
wherein the dihydroxy component further comprises up to 20 mole percent of the total moles of the dihydroxy component of one or more dihydroxy comonomers to modify crystallinity of the polyester, preferably to increase heat of fusion ($\Delta H_f$) as determined by ASTM D3418, preferably wherein the one or more dihydroxy comonomers comprises an aromatic dihydroxy, preferably 4,4-dihydroxybiphenyl, preferably wherein hydroquinone comprises at least 80 mole percent of the dihydroxy component based on the total moles of the dihydroxy component.

19. The polyester of embodiment 18 wherein the polyester comprises a smectic phase, a semicrystalline morphology, or a combination thereof.

20. The polyester of any preceding embodiment, further exhibiting a flow temperature ($T_f$) as determined by ASTM D4065 at 1 Hz, less than a thermal decomposition temperature ($T_{d,5\%}$) as determined by ASTM D3850 using a temperature ramp of 10° C./min under nitrogen.

21. The polyester of any preceding embodiment, further exhibiting an isotropic temperature ($T_i$) as determined by ASTM D3418 less than the thermal decomposition temperature ($T_{d,5\%}$) as determined by ASTM D3850 using a temperature ramp of 10° C./min under nitrogen.

22. The polyester of any preceding embodiment, wherein the polyester exhibits one or more or all of the following:
a thermal decomposition temperature ($T_{d,5\%}$) as determined by ASTM D3850 using a temperature ramp of 10° C./min under nitrogen, of about 400° C. or more, preferably about 450° C. or more, about 475° C. or more, or about 480° C. or more;
a flow temperature ($T_f$) as determined by ASTM D4065 at 1 Hz, of about 400° C. or less, preferably about 350° C. or less, or about 300° C. to about 350° C.;
an isotropic temperature ($T_i$) as determined by ASTM D3418, of about 400° C. or less, preferably about 350° C. or less, or about 300° C. to about 350° C.;
a glass transition temperature ($T_g$) as determined by ASTM D3418, of about 220° C. or less, preferably about 175° C. to about 210° C., or about 180° C. to about 205° C.;

a zero-shear melt viscosity ($\eta^*$) determined at 340° C. at a frequency of 0.1 radians/second, by frequency sweep on 8 mm parallel plates under nitrogen at 1% strain, of at least about 50,000 Pa-s, preferably at least about 75,000 Pa-s, at least about 100,000 Pa-s, at least about 1,000,000 Pa-s, or at least about 2,000,000 Pa-s.

23. The polyester of any preceding embodiment, wherein the polyester exhibits one or more or all of the following:

a thermal decomposition temperature ($T_{d,5\%}$) as determined by ASTM D3850 using a temperature ramp of 10° C./min under nitrogen, of about 475° C. to about 495° C., preferably about 480° C. to about 490° C., or about 484° C. to about 487° C.;

a flow temperature ($T_f$) as determined by ASTM D4065 at 1 Hz, of about 300° C. to about 350° C., preferably about 310° C. to about 340° C., about 320° C. to about 330° C., about 322° C. to about 327° C., or about 324° C. to about 325° C.;

an isotropic temperature ($T_i$) as determined by ASTM D3418, of about 310° C. to about 340° C., preferably about 320° C. to about 330° C., about 322° C. to about 327° C., or about 324° C. to about 325° C.;

a glass transition temperature ($T_g$) as determined by ASTM D3418, of about 180° C. to about 205° C., preferably about 182° C. to about 200° C., about 184° C. to about 198° C., about 182° C. to about 186° C., about 184° C., about 196° C. to about 200° C., or about 198° C.;

a zero-shear melt viscosity ($\eta^*$) determined at 340° C. at a frequency of 0.1 radians/second, by frequency sweep on 8 mm parallel plates under nitrogen at 1% strain, of about 50,000 Pa-s to about 5,000,000 Pa-s, preferably about 75,000 Pa-s to about 3,500,000 Pa-s, about 100,000 Pa-s to about 2,500,000 Pa-s, about 100,000 Pa-s, or about 2,500,000 Pa-s.

24. A method comprising:

contacting a dihydroxy component comprising at least about 80 mole percent of hydroquinone or a hydroquinone diester derivative, based on the total moles of the dihydroxy component, with a diacid component comprising at least about 80 mole percent of 3,4'-biphenyl dicarboxylic acid (3,4'-BB) or an ester derivative of 3,4'-BB, based on the total moles of the diacid component, and optionally with a hydroxy-carboxylic acid component in an amount up to 20 mole percent, based on the total moles of the diacid component and the hydroxy-carboxylic acid component, under polycondensation conditions; and forming a polyester comprising the dihydroxy and diacid components; or preferably forming the polyester of any of embodiments 1 to 23.

25. The method of embodiment 24, further comprising processing the polyester in a liquid crystalline glass phase.

26. The method of embodiment 24 or embodiment 25, wherein the polyester consists essentially of hydroquinone and 3,4'-biphenyl dicarboxylate.

27. The method of any of embodiments 24 to 26, wherein the dihydroxy component consists of hydroquinone, and the diacid component consists of 3,4'-biphenyl dicarboxylate.

28. The method of any of embodiments 24 to 27, wherein the polyester is free of the hydroxy-carboxylic acid component.

29. The method of any of embodiments 24 to 28, wherein the dihydroxy component comprises the hydroquinone diester derivative comprising the reaction product of a hydroquinone with a carboxylic acid comprising from 1 to 6 carbon atoms or an anhydride comprising from 2 to 14 carbon atoms, to form the hydroquinone diester derivative.

30. The method of embodiment 29, wherein the hydroquinone diester derivative is hydroquinone dipivalate.

31. The method of any of embodiments 24 to 30, wherein the diacid component comprises 3,4'-BB in the free acid form.

32. The method of any of embodiments 24 to 31, wherein the polyester further comprises one or more comonomers in an amount effective to modify: crystallinity as determined by ASTM D3418; heat of fusion ($\Delta H_f$) as determined by ASTM D341; glass transition temperature ($T_g$), as determined by ASTM D3418; thermal decomposition temperature ($T_{d,5\%}$) as determined by ASTM D3850 using a temperature ramp of 10° C./min under nitrogen; the $T_f$; the $T_i$; zero shear melt viscosity ($\eta^*$) determined at 340° C. at a frequency of 0.1 radians/second, by frequency sweep on 8 mm parallel plates under nitrogen at 1% strain; or a combination thereof.

33. The method of embodiment 32, further comprising one or more of:

wherein the dihydroxy component comprises one or more aromatic dihydroxy component comonomers in an amount up to 20 mole percent, based on the total moles of the dihydroxy component;

wherein the diacid component comprises one or more aromatic diacid component comonomers in an amount up to 20 mole percent, based on the total moles of the diacid component; wherein the polyester comprises a hydroxy-carboxylic acid comonomer in an amount up to 20 mole percent, based on the total moles of the diacid component and the hydroxy-acid comonomer.

34. The method of embodiment 33, further comprising one or more of the following:

wherein the one or more aromatic dihydroxy comonomers is selected from: resorcinol, 4,4-dihydroxybiphenyl, and combinations thereof;

wherein the one or more aromatic diacid comonomers is selected from: terephthalic acid (TA), naphthalene dicarboxylic acid (NDA), 4,4'-biphenyl dicarboxylate (4,4'BB), isophthalic acid (IA), and combinations thereof;

wherein the hydroxy-carboxylic acid comonomer is p-hydroxy benzoic acid.

35. The method of any of embodiments 24 to 34, wherein the polyester formation is by acidolysis polycondensation.

36. The method of embodiment 35, further comprising hydrolyzing a 3,4'-bibenzoate diester to form the 3,4'-BB free acid.

37. The method of embodiment 35 or embodiment 36, further comprising esterifying hydroquinone with an ester-forming carboxylic acid, carboxylic acid anhydride, or combination thereof.

38. The method embodiment 37, wherein the carboxylic acid or anhydride is selected from acetic acid, acetic anhydride, pivalic acid, pivalic anhydride, or a combination thereof.

39. The method of any of embodiments 24 to 38, further comprising forming the polyester into a shaped article.

40. The method of embodiment 39, wherein the shaped article comprises a fiber, a nonwoven fabric, a film, or a molded article.

EXAMPLES

In the following examples, dimethyl 3,4'-biphenyl dicarboxylate (3,4'BB) was supplied by EXXONMOBIL. Pivalic anhydride (>99%) and hydroquinone diacetate were purchased from Sigma-Aldrich. All solvents, nitrogen gas (Praxair, 99.999%), and other gases were obtained from commercial sources and used as received. All other solvents were obtained from Spectrum Chemicals and used as received.

NMR analysis: $^1$H and $^{13}$C NMR spectra were acquired on a VARIAN UNITY 400 (400 MHz) instrument at 23° C. in DMSO-d6 and CDCl$_3$, and the polymer required TFA-d.

Thermal Characterization: The thermal stability of polymers was demonstrated through thermal gravimetric analysis (TGA) using a Q50 instrument (TA Instruments, New Castle, Del.). A one-step weight loss profile was obtained using a temperature ramp of 10° C./min from 25 to 600° C. under nitrogen. Differential scanning calorimetry (DSC) was performed on a Q1000 instrument (TA Instruments, New Castle, Del.), calibrated with indium and zinc standards, using a heat/cool/heat cycle (second heating) at a heating rate of 10° C./min and cooling rate of 100° C./min. Data analysis occurred on the second heat cycles using the inflection point of the $T_g$ and the maximum of the $T_i$ and $T_m$.

Compression Molding: Compression molding of the polymers utilized a sandwich of aluminum plates, Kapton® sheets coated with a REXCO PARTALL® Power Glossy Liquid mold release agent, and 400 μm thick stainless-steel shims between which the samples were placed. Heating above the Ti of the polymer at 340° C. generated films upon molding and an immediate quench in an ice bath quickly cooled the sample.

Dynamic Mechanical Analysis: Dynamic mechanical analysis (DMA) utilized an oscillatory amplitude of 15 μm, a frequency of 1 Hz, and a static force of 0.01 N while in tension mode. The TA Instruments Q800 DMA used a heating rate of 3° C. min-1 until reaching 300° C., and subsequently the sample was rapidly cooled to room temperature prior to restarting the run. Analysis of the DMA measurement occurred on the second heat and maximum of the tan delta afforded the Tg of the polymers.

Wide-angle X-ray scattering (WAXS): These tests were performed using a RIGAKU S-Max 3000 3 pinhole SAXS system, equipped with a rotating anode emitting X-rays with a wavelength of 0.154 nm (Cu Kα). The sample-to-detector distance was 110 mm and the q-range was calibrated using a silver behenate standard. Two-dimensional diffraction patterns were obtained using an image plate with an exposure time of 1 h. WAXS data were analyzed using the SAXSGUI software package to obtain radially integrated WAXS intensity versus the scattering vector, 2θ, where q=(4π/λ)sin(θ), θ is one half of the scattering angle and λ is the wavelength of X-ray.

Polarized Optical Microscopy: Polarized optical microscopy (POM) was performed by placing the samples between crossed polarizers of a NIKON LV100 ECLIPSE optical microscope equipped with a LINKHAM TMS 94 hot stage and a NIKON DXM1200 digital camera. Samples were pressed between glass slides after heating past the $T_i$ and cooled at an approximate rate of either 10° C. min$^{-1}$ or 75° C. min$^{-1}$.

Melt Rheological Analysis: Melt rheology was performed on a TA Instruments DHR-2 rheometer at 340° C. using a 1.25% strain with an 8 mm disposable parallel-plate geometry under N2 flow. A hole punch generated circular disks of the sample from a compression molded film, which were stacked 8 tall on the bottom geometry. The sample was heated to 340° C. then compressed together by lowering the top geometry into place. The linear viscoelastic region was determined prior to each frequency sweep using a strain sweep from 0.01 to 10% oscillatory strain at 1 rad s-1 to guarantee melding of the films. Frequency sweeps ranging from 1 to 100 rad s$^{-1}$ afforded complex viscosity values and standard deviations from a minimum of three runs.

Mechanical Analysis: The polymer samples were injection molded and the mechanical properties were tested on the molded bars according to the following procedure. Samples were injection molded for tensile testing on a BOY-XS injection molding machine, with mold temperature of 7° C. (45° F.); barrel temperatures: 275° C.-290° C.; holding pressure: 6.9 MPa (1000 psi); and cycle time: ~60 sec and were used for measurements without additional conditioning. Testing was conducted on an INSTRON 5500R with a crosshead motion rate of 10 mm/min and an initial grip separation of 25.4±2.0 mm, and on an MTS Model No. 4204 with a 1 kN load cell and a crosshead motion rate of 5 mm/min (before 5% strain) and 10 mm/min (after 5% strain) with an initial grip-to-grip separation of 25.4±2.0 mm. Tensile modulus was estimated by crosshead displacement, but would likely be lower possibly due to sample slippage, which artificially increased the measured strain. ASTM D638 requires use of an extensometer in the initial portion of the test to determine strain. For purposes herein, an EPSILON 3442 miniature extensometer was employed to more accurately measure the tensile modulus and related parameters.

Example 1: Synthesis of biphenyl 3,4'-dicarboxylic acid

Dimethyl 3,4'-bibenzoate was hydrolyzed as seen in Scheme 1:

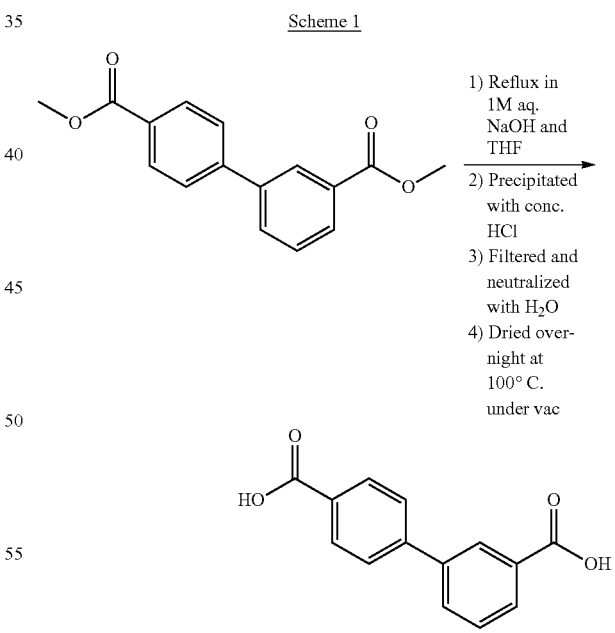

Figure 1B:
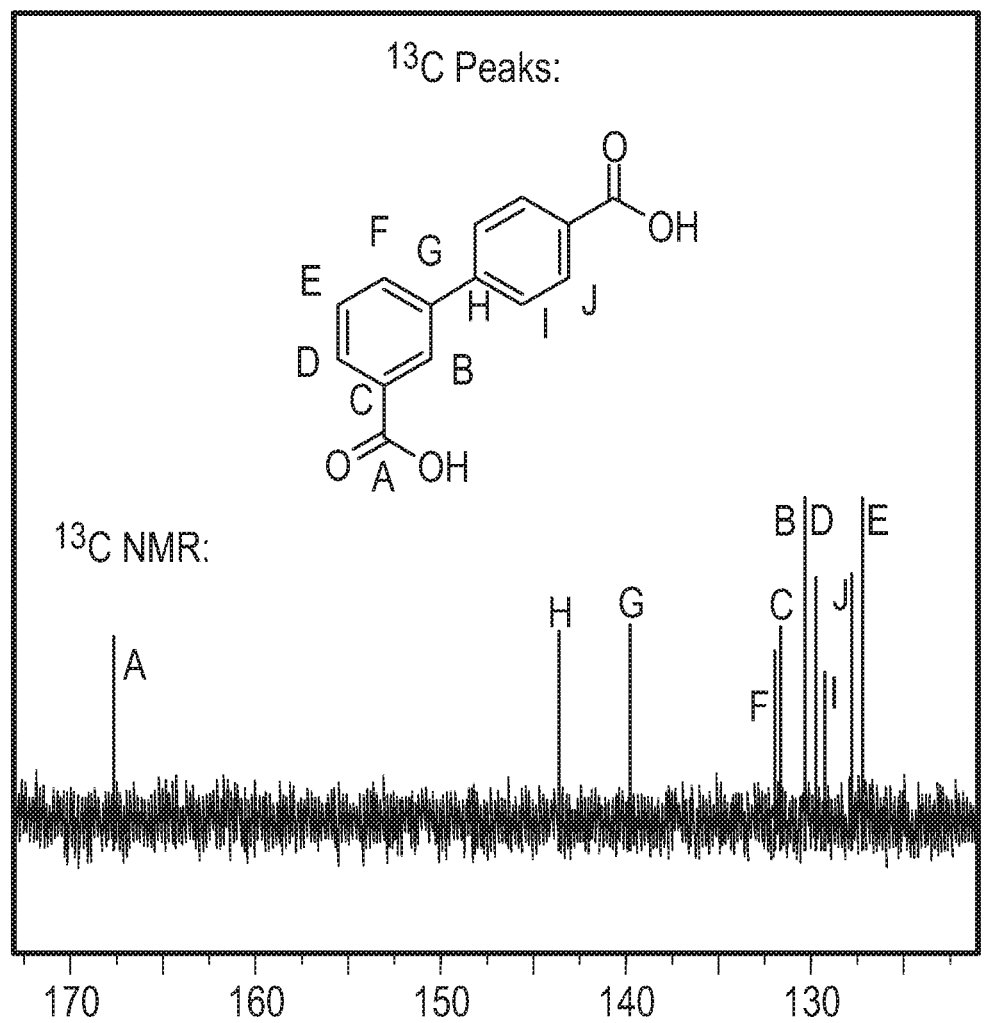
FIG. 1B is a $^{13}$C NMR spectrum and peak assignment for the hydrolyzed 3,4'-bibenzoate according to Example 1 below.

Dimethyl 3,4'-bibenzoate (39.94 g, 0.148 mol) was refluxed for 24 h in a 1M sodium hydroxide solution (400 mL total) of 1:1 deionized water: THF. The solution was filtered and THF removed using a rotary evaporator. Biphenyl 3,4'-dicarboxylic acid was precipitated by the addition of concentrated HCl. A pasty white precipitate was recovered and washed with distilled water until neutralized. The product was dried overnight at 120° C. in a vacuum oven. The chemical structure was confirmed by $^1$H and $^{13}$C NMR as shown in FIGS. 1A and 1B, respectively.

Example 2: Synthesis of poly(hydroquinone-3,4'-bibenzoate) from hydroquinone diacetate and biphenyl 3,4'-dicarboxylic acid Hydroquinone diacetate (HQa) has the following structure:

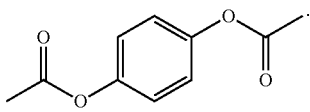

HQa was obtained commercially and purified by recrystallization in a 1:1 mixture of ethanol:distilled water. Long, finger-like white crystals were filtered from the solution and dried over night at 100° C. in a vacuum oven. Structure of the purified product was confirmed by $^1$H and $^{13}$C NMR. Acidolysis polycondensation of HQa and 3,4'BB afforded liquid crystalline polyesters without copolymerization, as illustrated in Scheme 2:

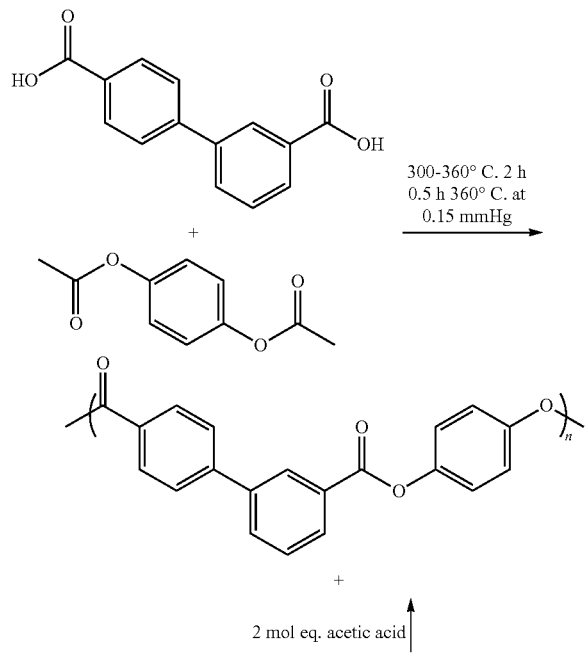

Figure 2A:
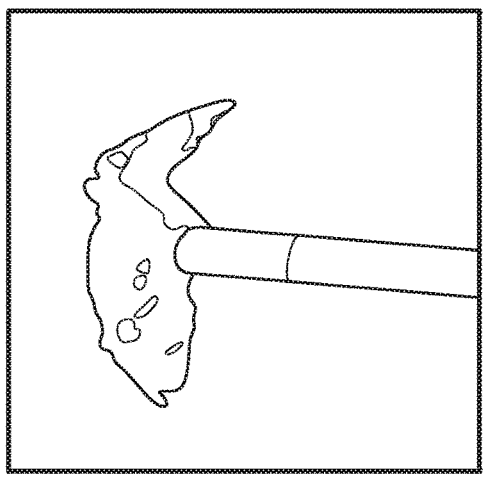
FIG. 2A is a line drawing reproduction of a photograph of the poly(hydroquinone-3,4'-bibenzoate) obtained from the reactor according to Example 2 below.
Figure 2B:
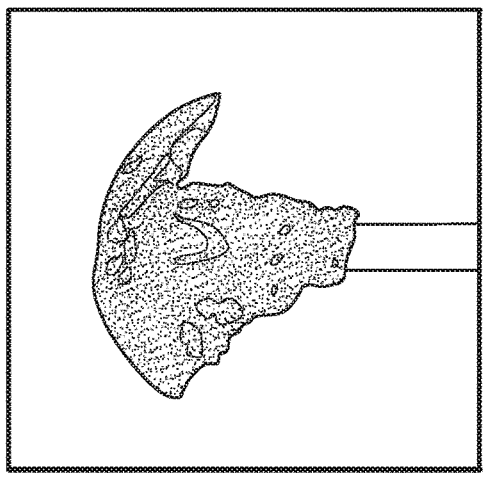
FIG. 2B is a line drawing reproduction of a photograph indicating the darker color of the poly(hydroquinone-3,4'-bibenzoate) obtained from the reactor according to Example 3 below.
Figure 2C:
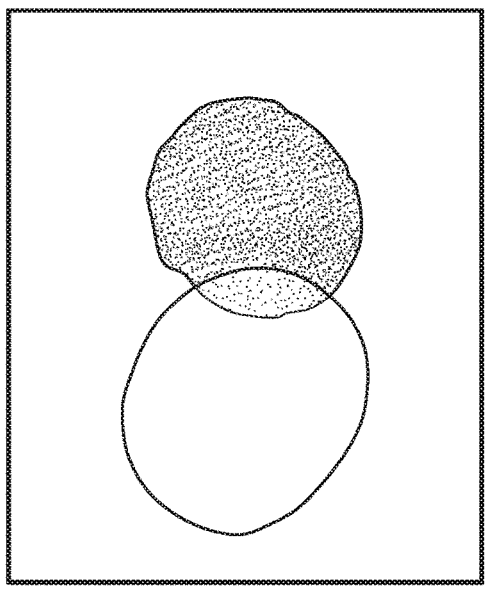
FIG. 2C is a line drawing reproduction of a photograph of a compression molded disk of the poly(hydroquinone-3,4'-bibenzoate) of Example 2, partially overlapping a compression molded disk of the poly(hydroquinone-3,4'-bibenzoate) of Example 3, which uses gradient stippling to indicate the transparency or opacity of the examples observed in the photograph.

Biphenyl 3,4'-dicarboxylic acid (6.237 g, 0.026 mol) and hydroquinone diacetate (5 g, 0.026 mol) were added to an oven-dried 100 mL round-bottom flask. A mechanical stir rod, distillation apparatus, and t-neck were attached and the reaction purged three times with nitrogen and vacuum. The reactor was lowered into a molten metal bath under constant nitrogen purge, heated to 300° C. with stirring for 0.5 h, then to 330° C. for 0.5 h, then to 360° C. for 0.5 h, and finally vacuum (0.15 mmHg) was applied at 360° C. for 0.5 h. The resulting polymer was a white product as shown in the line drawing reproduction of the photograph of FIG. 2A. The product was removed from the stir rod and used without further purification. The polymer was compression molded at 340° C. followed by a quench in an ice bath. The transparent film is seen on the left side of FIG. 2C, which is a line drawing reproduction of a photograph of the examples. The compression molded disk of Example 2 is shown partially overlapped with and in front of a compression molded disk produced from Example 3 below. The transparency observed in the photograph of the examples is indicated using gradient stippling. The observed transparency of the polymer produced in Example 2 is not common with traditional, fully-aromatic liquid crystalline polyesters. $^1$H NMR was performed using a 1:1 mixture d-TFA:CDCl$_3$ to confirm the final structure of polymer. The photographs of FIGS. 2A, 2B, and 2C as originally filed are reproduced in the corresponding priority US patent application.

Example 3: Synthesis of poly(hydroquinone-3,4'-bibenzoate) from hydroquinone dipivalate and biphenyl 3,4'-dicarboxylic acid Hydroquinone dipivalate (HQp) was synthesized, as illustrated in Scheme 3:

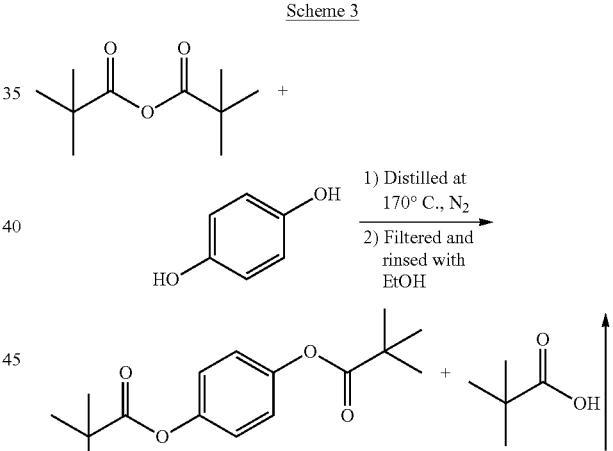

Hydroquinone (5.1 g, 0.046 mol) and pivalic anhydride (20 mL, 0.135 mol) were added to an oven-dried 100 mL round-bottom flask, and a t-neck, distillation apparatus, and mechanical stir rod were affixed. The reactor was purged three times with nitrogen and vacuum to achieve an inert environment. The reaction was held at 170° C. under a constant nitrogen purge to allow the reaction to proceed and remove pivalic acid as it was produced. Monitoring the reaction by thin layer chromatography (TLC), the reaction was complete after 1 h, and then cooled to room temperature. The product was filtered and rinsed with ethanol. Structure and purity were confirmed by $^1$H NMR.

Acidolysis polycondensation of HQp and 3,4'BB afforded liquid crystalline polyesters without copolymerization, as illustrated in Scheme 4:

Scheme 4

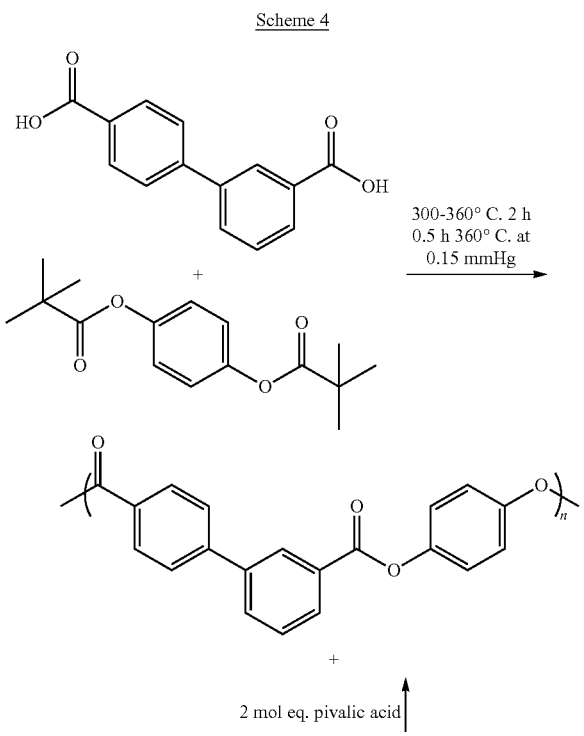

Biphenyl 3,4'-dicarboxylic acid (6.237 g, 0.026 mol) and hydroquinone dipivalate (7.167 g, 0.026 mol) were added to an oven-dried 100 mL round-bottom flask. A mechanical stir rod, distillation apparatus, and t-neck were attached and the reaction purged three times with nitrogen and vacuum. The reactor was lowered into a molten metal bath under constant nitrogen purge, heated to 300° C. with stirring for 0.5 h, then to 330° C. for 0.5 h, then to 360° C. for 0.5 h, and finally vacuum (0.15 mmHg) was applied at 360° C. for 0.5 h to remove any residual pivalic acid and drive the reaction to completion. The resulting polymer was a tan product as shown FIG. 2B, which is a line drawing reproduction of a photograph of polymer produced in Example 3. The darker color of the polymer produced in Example 3, relative to the essentially colorless polymer produced in Example 2, is indicated in the line drawing by gradient stippling. The product was removed from the stir rod and used without further purification. The polymer was compression molded at 340° C. followed by a quench in an ice bath. The transparent film seen in the right side of FIG. 2C, which is a line drawing reproduction of a photograph of the examples. The compression molded disk of Example 3 is shown partially overlapped with and behind the compression molded disk produced from Example 2 above. The transparency observed in the photograph of the examples is indicated using gradient stippling. The observed transparency of the polymer produced in Example 3 is not common with traditional, fully-aromatic liquid crystalline polyesters. $^1$H NMR was performed using a 1:1 mixture d-TFA:CDCl$_3$ to confirm the final structure of polymer, and no difference was observed between the poly(HQp-3,4'BB) and the poly(HQa-3,4'BB) (Example 2).

Figure 3A:
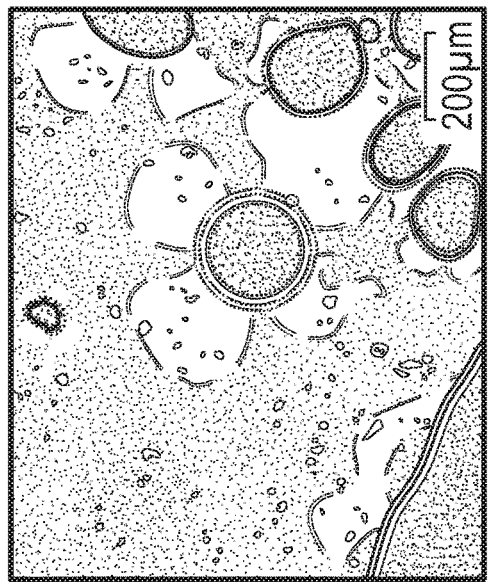
FIG. 3A is a line drawing reproduction of a polarized optical microscopic photograph of poly(hydroquinone-3,4'-bibenzoate) at 150° C. according to Examples 2 and 3 below, in which gradient stippling and dashed lines are used to indicate the birefringence observed in the photograph of the example.
Figure 3B:
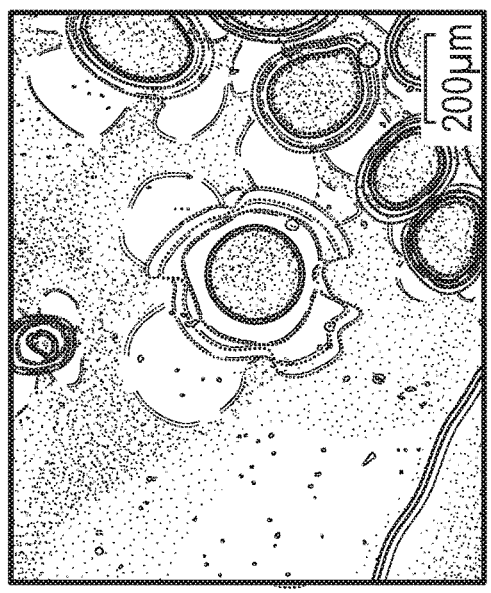
FIG. 3B is a line drawing reproduction of a polarized optical microscopic photograph of poly(hydroquinone-3,4'-bibenzoate) at 290° C. according to Examples 2 and 3 below, in which gradient stippling and dashed lines are used to indicate the observed birefringence in the photograph of the example.
Figure 3C:
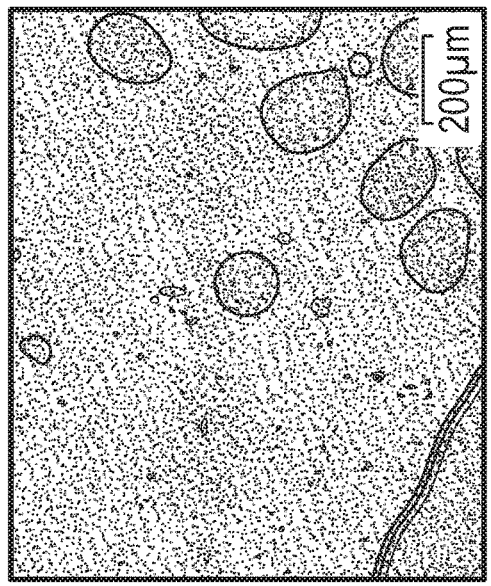
FIG. 3C is a line drawing reproduction of a polarized optical microscopic photograph of poly(hydroquinone-3,4'-bibenzoate) at 348° C. according to Examples 2 and 3 below, in which gradient stippling and dashed lines are used to indicate the observed loss in birefringence observed in the photograph of the example.

Polarized Optical Microscopy: POM was performed on the poly(HQ-3,4'BB) of Examples 2 and 3 at a variety of temperatures tracking the changes in liquid crystalline textures. The results are shown in FIGS. 3A, 3B, and 3C, which are line drawing reproductions of photographs of the examples under the indicated conditions. The photographs of FIGS. 3A, 3B, and 3C, as originally filed, are reproduced in the corresponding priority US patent application. As the figures show, when quenched from an isotropic state to a temperature of 150° C., which is below the $T_g$, birefringence was observed in the sample as indicated in FIG. 3A using gradient stippling and dashed lines in the line drawing reproduction of a photograph of the example. After heating to 290° C., which is above the glass transition temperature, a marbled nematic texture became more apparent in the example, as indicated in FIG. 3B using gradient stippling and dashed lines in the line drawing reproduction of a photograph of the example. The birefringence below the $T_g$ was not associated with a crystalline domain. When heated to 348° C., which is above the isotropic point, a loss of anisotropy was observed in the example, resulting in a black image as indicated in FIG. 3C using gradient stippling in the line drawing reproduction of a photograph of the example. This optical behavior is consistent with a polymer that cannot form crystalline domains, but maintains liquid crystalline ordering, i.e., a liquid crystalline glass.

WAXS: Performing WAXS on a compression molded film of poly(HQp-3,4' BB) after different thermal treatments verified the polarized optical microscopy. Rapidly cooling the initial compression molded film from the isotropic state (340° C.) in an ice bath provided a quench-cooled sample for analysis. A single diffuse scattering peak indicated the absence of a 2D layer structure that often forms lamellar morphologies prevalent in smectic mesophases; the data also confirmed the absence of the packing structure of crystalline domains. The few minor peaks occurring in the quenched film may have indicated insufficient quenching of the thick film in comparison to the much thinner polarized optical microscopy sample. Upon heating the polymer film for 5 min at 280° C., sharp angular reflections emerged at 5.2, 6.1, 13.1, 14.2, 18.6 19.6, 24.6, and 31.7° 2θ indicative of a semi-crystalline morphology forming in the polymer film corroborating the secondary shoulder observed in the DSC analysis. These sharp reflections increased slightly in intensity after longer annealing times (2 h at 280° C.). This limited crystallinity may have hindered the observation of a textural change in the optical microscopy after 10 min of annealing. Attempts to orient the quench-cooled sample below the Ti (310° C.) resulted in strain induced crystallization rather than orientation. While the crystallization during orientation limited the ability to confirm the mesophase morphology for the polymer, the observation of a schlieren texture using polarized optical microscopy highly suggests a nematic morphology.

Figure 4:
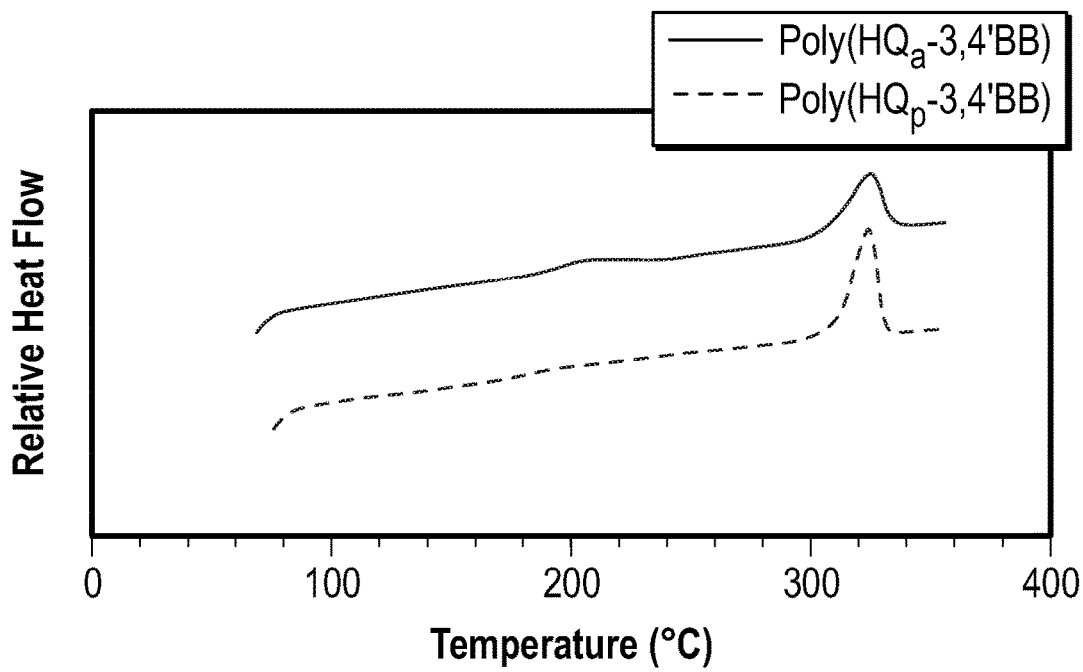
FIG. 4 shows the second heating curves from differential scanning calorimetry (DSC) of the poly(hydroquinone-3,4'-bibenzoates) according to Examples 2 and 3 below.

Thermal Characterization: Using TGA, poly(HQ$_a$-3,4'BB) and poly(HQ$_p$-3,4'BB) exhibited a $T_{d,5\%}$ of 484° C. and 487° C., respectively. DSC was used with a heat/cool/heat cycle (second heating) at a heating rate of 10° C./min and cooling rate of 100° C./min to obtain glass transition temperature ($T_g$) and isotropic temperature ($T_i$). As seen from FIG. 4, the $T_g$ was 198° C. and 184° C. for poly(HQ$_a$-3,4'BB) and poly(HQ$_p$-3,4'BB), respectively, which could be a result of different molecular weights where poly(HQ$_p$-3,4'BB) has lower molecular weight. The $T_i$ was found to be 332° C. and 324° C. for poly(HQ$_a$-3,4'BB) and poly(HQ$_p$-3,4'BB), respectively.

Figure 5:
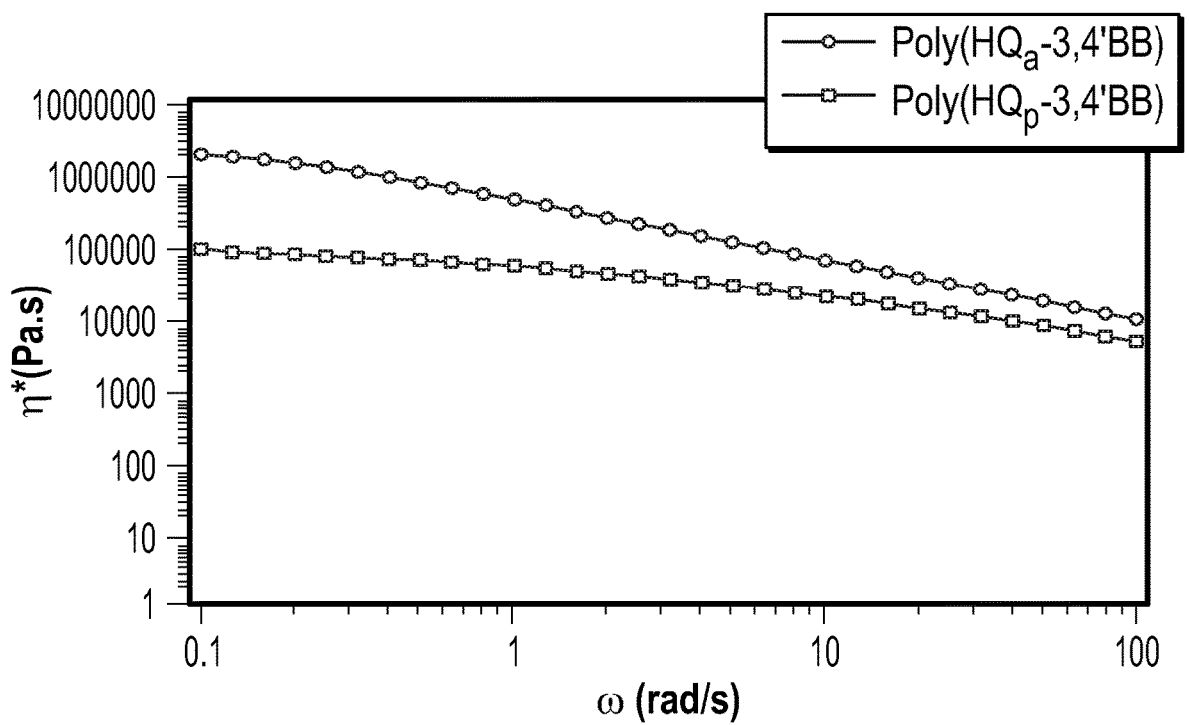
FIG. 5 shows the frequency sweep curves for the poly(hydroquinone-3,4'-bibenzoates) according to Examples 2 and 3 below.
Figure 5A:
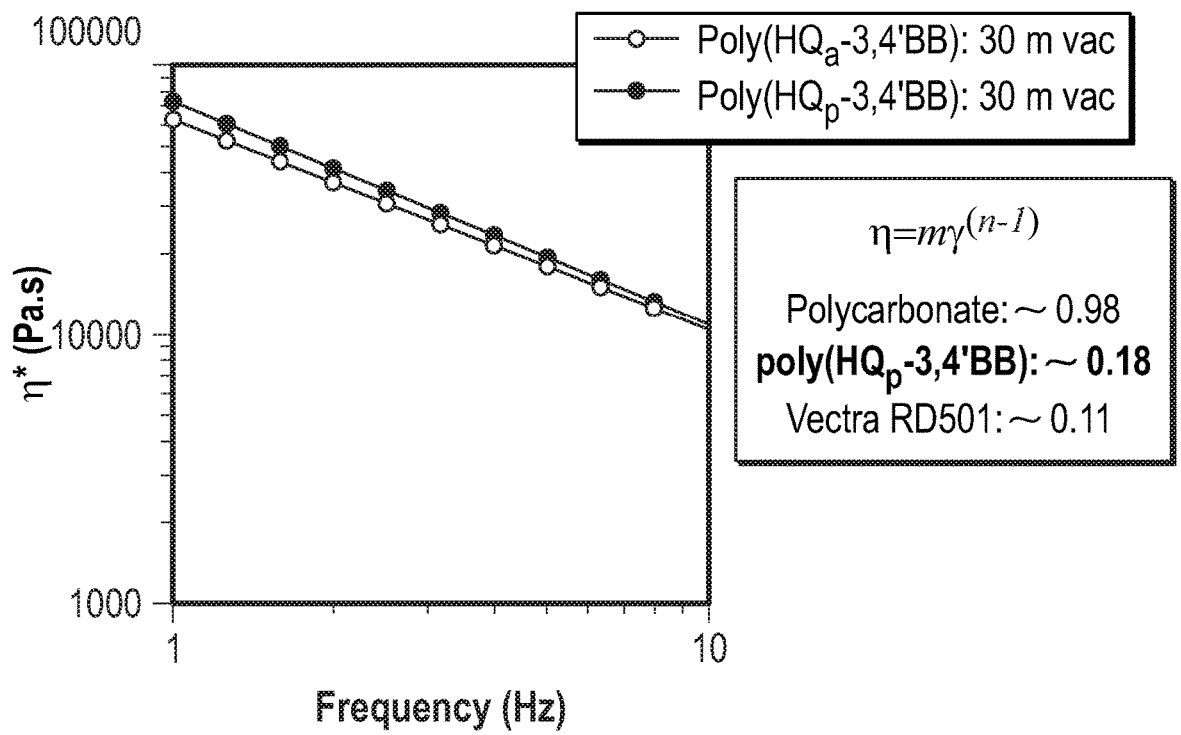
FIG. 5A shows the power law fits of the frequency sweep curves for the poly(hydroquinone-3,4'-bibenzoates) of FIG. 5.

Rheological Analysis: Frequency sweep studies were used to determine the zero-shear viscosity of the two polymers of Examples 2 and 3, as seen in FIG. 5. Poly(HQ$_a$-3,4'BB) had a zero-shear viscosity of 2510 Pa-s, which was higher than poly(HQ$_p$-3,4'BB) indicating the poly(HQ$_p$-3,4'BB) had a lower molecular weight. As those skilled in the art will appreciate, the zero-shear viscosity can be adjusted by aiming for higher or lower molecular weights, e.g., by utilizing the modified Carothers equation. Using a power law model fit as seen in FIG. 5A, it is seen that the power law coefficient, n, was about 0.18 for poly(HQ-3,4'BB). In general, the lower the power law coefficient the larger the shear thinning. The shear thinning for poly(HQ-3,4'BB) was similar to VECTRA RD501 liquid crystalline polymer, with a power law coefficient determined experimentally to be about 0.11, and greater than that of polycarbonate, with a power law coefficient value reported in the literature of about 0.98.

Figure 6:
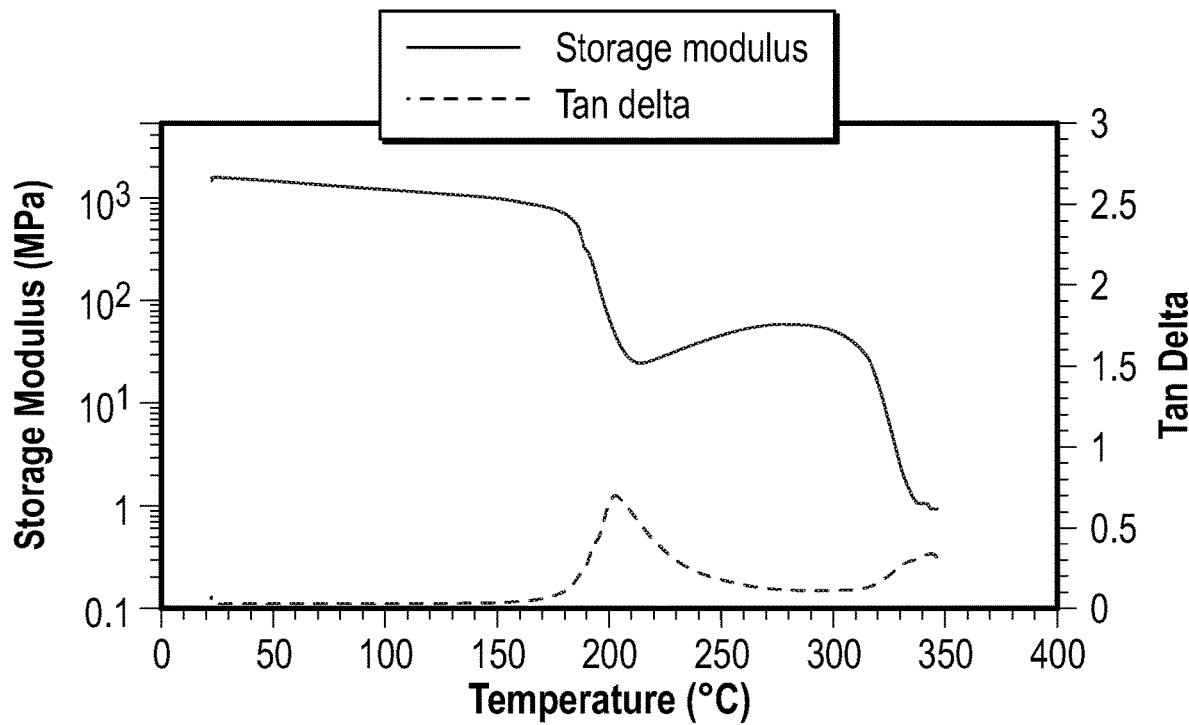
FIG. 6 shows the dynamic mechanical analysis (DMA) curves for the poly(hydroquinone-3,4'-bibenzoate) according to Example 2 below.

Dynamic Mechanical Analysis: As seen in FIG. 6, the $T_g$ obtained as the tan delta peak was 205° C. for the polymer of Example 2. Above the $T_g$, an increase in the modulus was observed, consistent with an enhanced mobility of the polymer chains allowing more ordering to occur, and also with the increase in birefringence seen in the polarized optical microscopy above the $T_g$ in FIG. 3B. The flow temperature ($T_{flow}$) obtained as the onset of the second modulus drop was 325° C., which correlates with the isotropic temperature of this polymer.

Mechanical Analysis: The poly(HQ$_p$-3,4'BB) of Example 2 was evaluated for mechanical properties, and the results are presented in Table 1.

TABLE 1

| Mechanical Properties of poly(HQ$_p$-3,4'BB) | |
|---|---|
| Flexural Modulus (MPa) | 4842.35 |
| Flexural Strength (MPa) | 179.28 |
| Tensile Modulus (MPa) | 4712.23 |
| Tensile Strength @ Max Load (MPa) | 73.93 |
| Tensile Strain to Failure (%) | 1.87 |

Examples 4-6: Synthesis of poly(hydroquinone-3,4'-bibenzoate-co-isophthalate)

The (co)polyesters were prepared from equimolar amounts of hydroquinone diacetate and biphenyl 3,4'-dicarboxylic acid generally as described in Example 2 above, in which a portion of the 3,4'BB was exchanged with either 5, 10, or 20 mole percent of isophthalic acid (IA). The monomers were added into an oven-dried 100 mL round-bottom flask. A mechanical stir rod, distillation apparatus, and t-neck were attached and the reaction purged three times with nitrogen and vacuum. The reactor was lowered into a molten metal bath under constant nitrogen purge, heated to 300° C. with stirring for 0.5 h, then to 330° C. for 0.5 h, then to 360° C. for 0.5 h, and finally vacuum (0.15 mmHg) was applied at 360° C. for 0.5 h to remove any residual acetic acid and drive the reaction to completion. The resulting polymer was removed from the stir rod and used without further purification.

Figure 7:
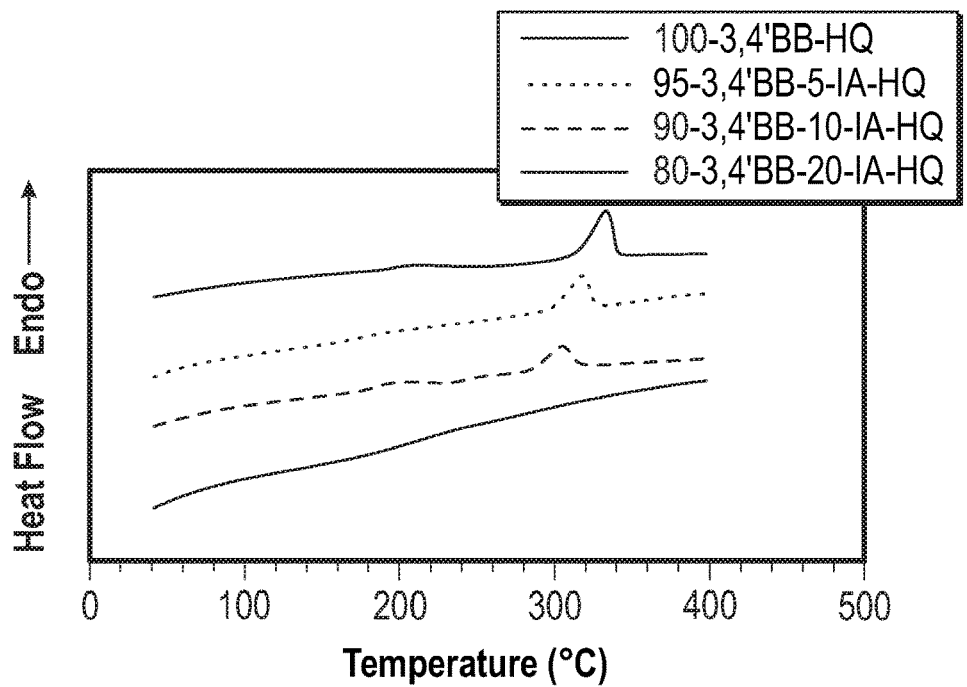
FIG. 7 shows the second heating curves from DSC of the poly(hydroquinone-3,4'-bibenzoate-co-isophthalate) series according to Examples 4-6 below.
Figure 8:
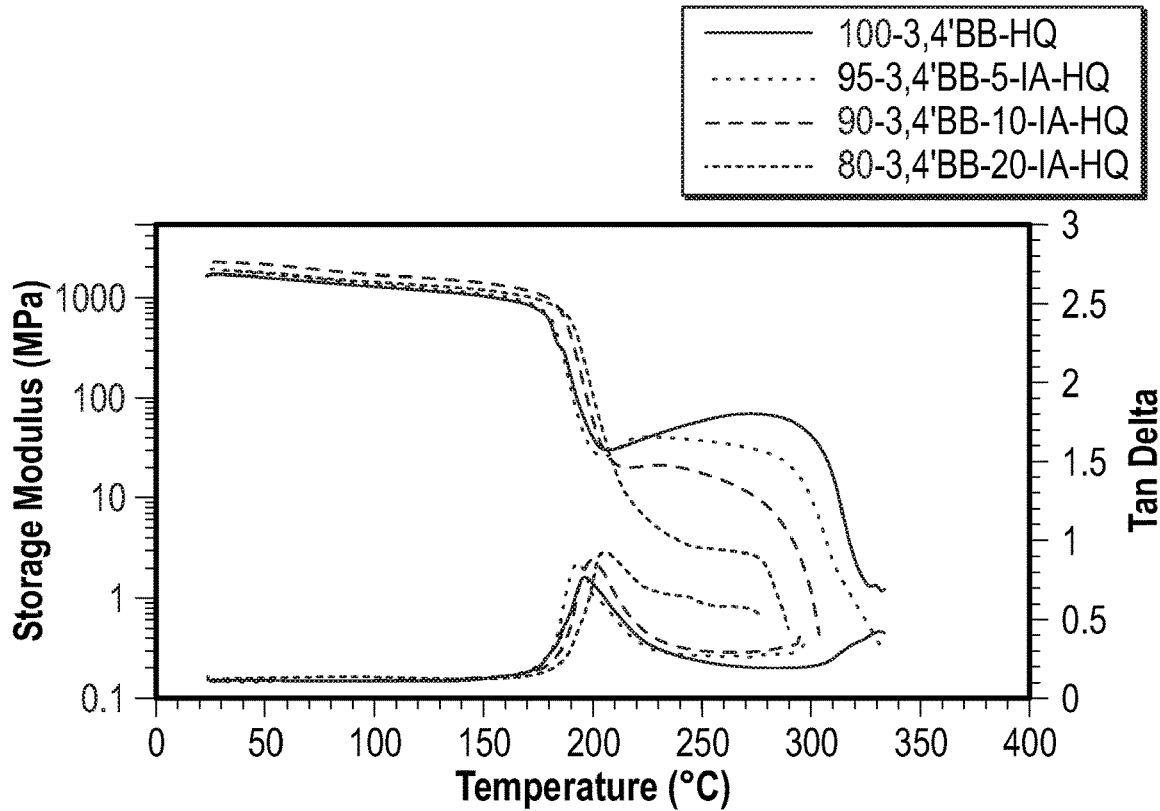
FIG. 8 shows the DMA curves for the poly(hydroquinone-3,4'-bibenzoate-co-isophthalate) series according to Examples 4-6 below.
Figure 9:
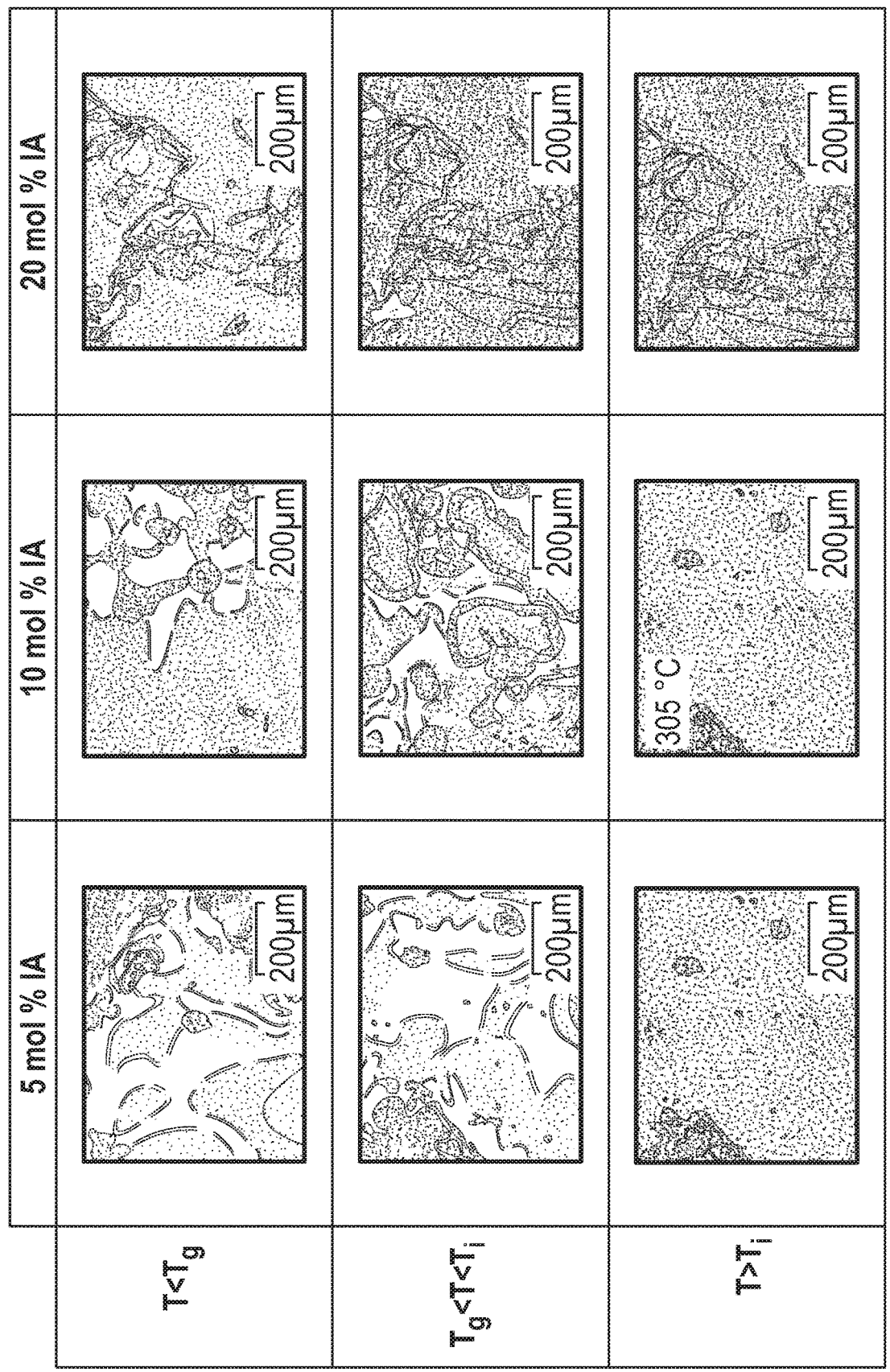
FIG. 9 is a chart of line drawing reproductions of the polarized optical microscopic photographs for the poly(hydroquinone-3,4'-bibenzoate-co-isophthalate) series by comonomer content versus temperature according to Examples 4-6 below, in which gradient stippling and dashed lines are used to indicate the observed birefringence or loss in birefringence observed in the photograph of the example.
Figure 10:
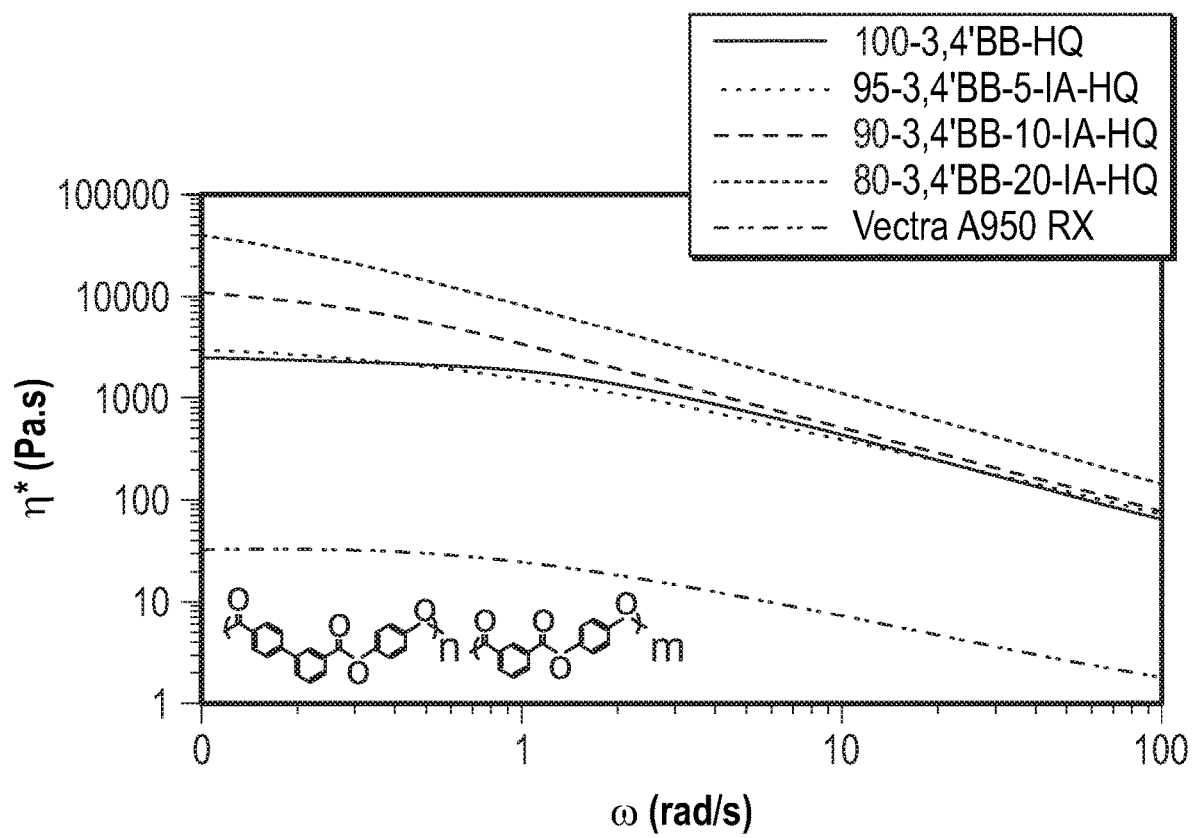
FIG. 10 shows the frequency sweep curves for the poly(hydroquinone-3,4'-bibenzoate-co-isophthalate) series by comonomer content versus temperature according to Examples 4-6 below.

The introduction of IA as a secondary kinked monomer appeared to disrupt the liquid crystallinity of poly(HQ-3,4'BB), as seen in FIG. 7. As higher amounts of IA are utilized, the $T_i$ shifts to lower temperatures and the heat of transition ($\Delta H_i$) decreases in size. As seen in FIG. 8, DMA correlated with the DSC analysis, and demonstrated a systematic decrease in the $T_{flow}$ as IA incorporation increased. The plateau modulus also exhibited a systematic decrease with increasing IA content, and the (co)polyester became nearly amorphous at 20 mol % IA. This trend was further confirmed using polarized optical microscopy (POM), as seen in FIG. 9, which is a chart of line drawing reproductions of the POM series arranged by comonomer content in columns (5, 10, and 20 mol % IA) versus temperature in rows (below $T_g$, between $T_g$ and $T_i$, and above $T_i$), in which gradient stippling and dashed lines are used to indicate the observed birefringence or loss in birefringence observed. The photographs of FIG. 9 as originally filed are reproduced in the corresponding priority US patent application. The incorporation of 5 mol % IA showed a clearly marbled nematic texture. As more IA was incorporated into the (co)polyester, a decrease in the observed birefringence occurred, indicating the liquid crystallinity had been disrupted. FIG. 10 shows the rheological frequency sweep curves for the poly(HQ$_a$-IA-3,4'BB) (co)polyester series.

Examples 7-9: Synthesis of poly(hydroquinone-3,4'-bibenzoate-co-terephthalate)

The (co)polyesters were prepared from equimolar amounts of hydroquinone diacetate and biphenyl 3,4'-dicarboxylic acid generally as described in Example 2 above, in which a portion of the 3,4'BB was exchanged with either 5, 10, or 20 mole percent of terephthalic acid (TA). The monomers were added into an oven-dried 100 mL round-bottom flask. A mechanical stir rod, distillation apparatus, and t-neck were attached and the reaction purged three times with nitrogen and vacuum. The reactor was lowered into a molten metal bath under constant nitrogen purge, heated to 300° C. with stirring for 0.5 h, then to 330° C. for 0.5 h, then to 360° C. for 0.5 h, and finally vacuum (0.15 mmHg) was applied at 360° C. for 0.5 h to remove any residual acetic acid and drive the reaction to completion. The resulting polymer was removed from the stir rod and used without further purification.

Figure 11:
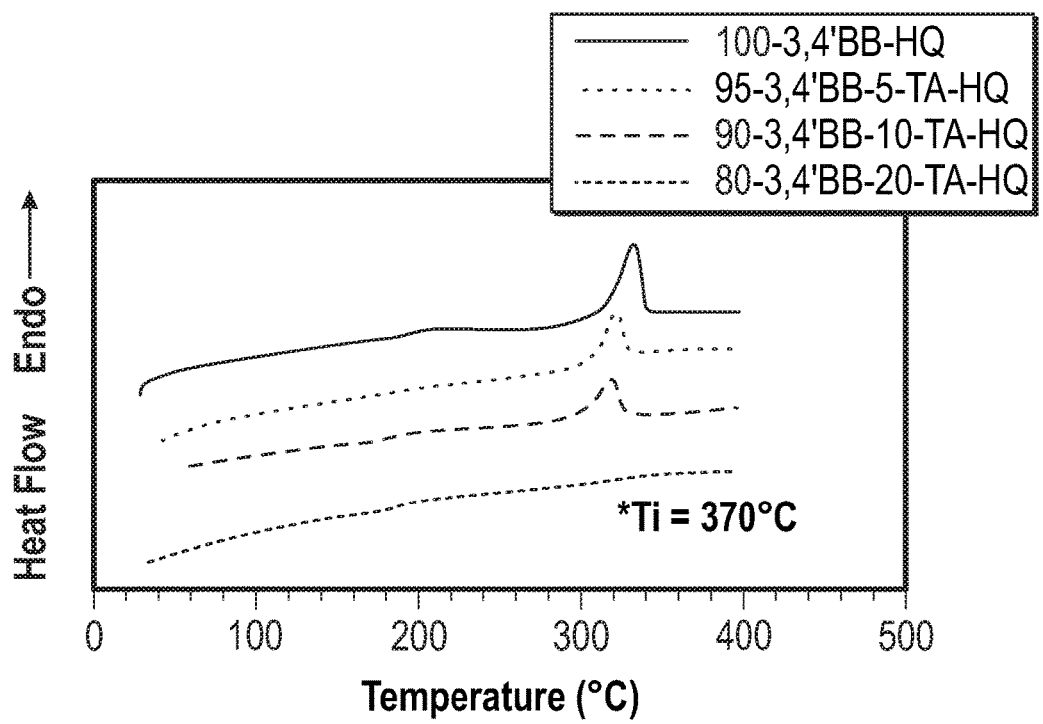
FIG. 11 shows the second heating curves from DSC of the poly(hydroquinone-3,4'-bibenzoate-co-terephthalate) series according to Examples 7-9 below.
Figure 12:
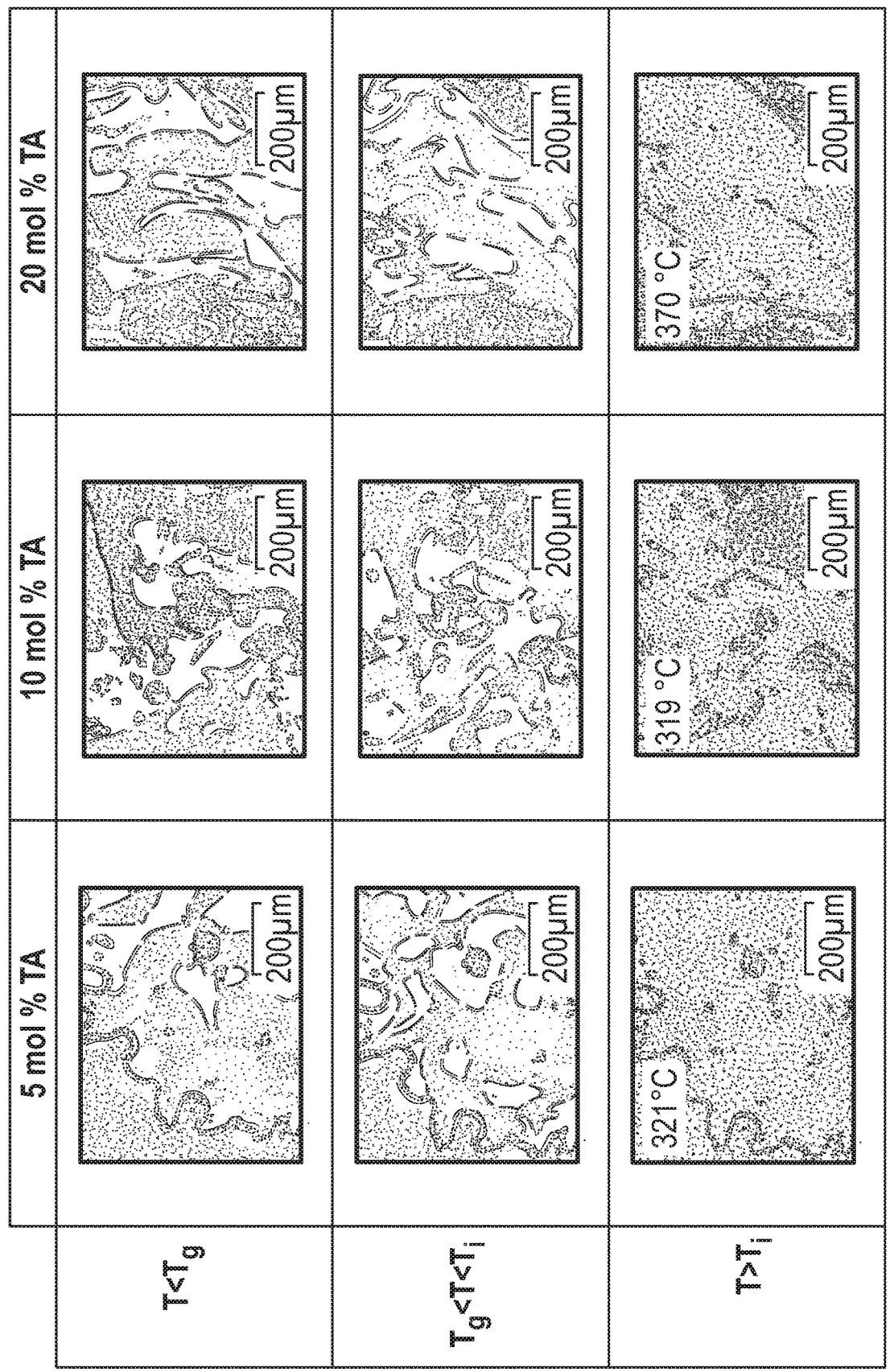
FIG. 12 is a chart of line drawing reproductions of the polarized optical microscopic photographs for the poly(hydroquinone-3,4'-bibenzoate-co-terephthalate) series by comonomer content versus temperature according to Examples 7-9 below, in which gradient stippling and dashed lines are used to indicate the observed birefringence or loss in birefringence observed in the photograph of the example.
Figure 13:
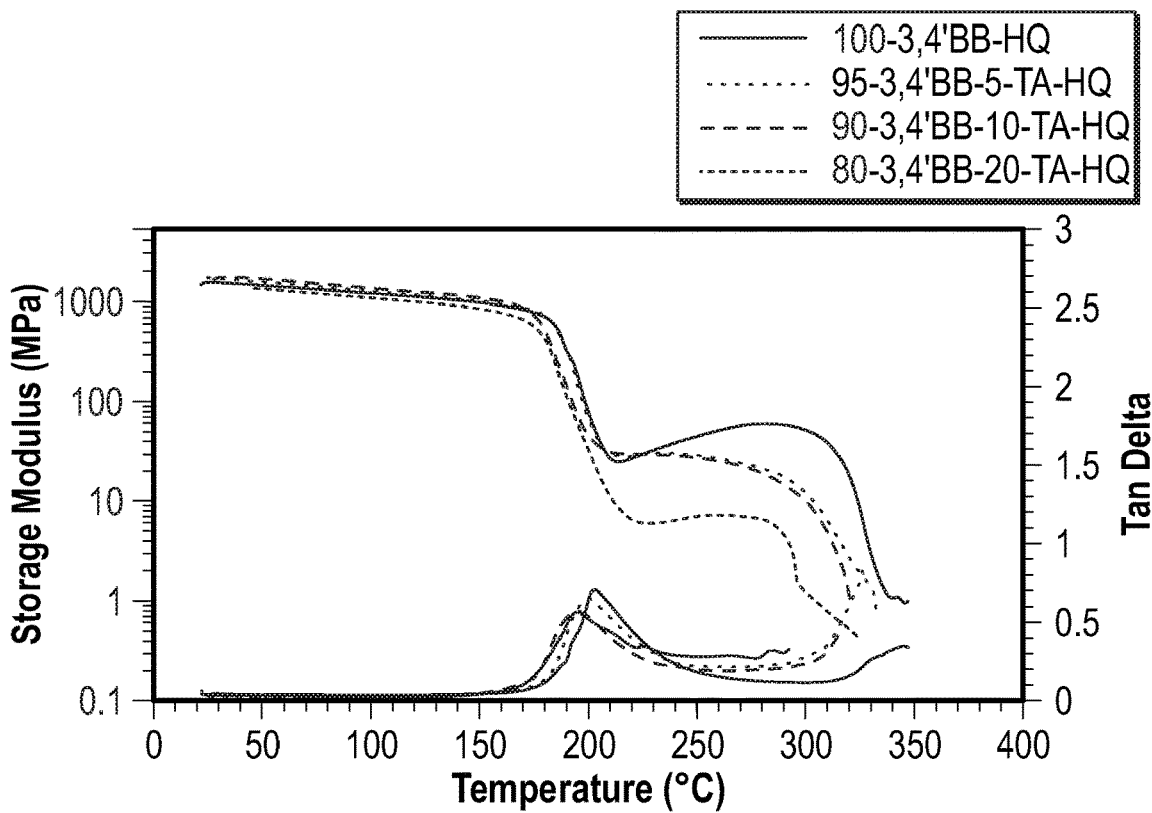
FIG. 13 shows the DMA curves for the poly(hydroquinone-3,4'-bibenzoate-co-terephthalate) series according to Examples 7-9 below.
Figure 14:
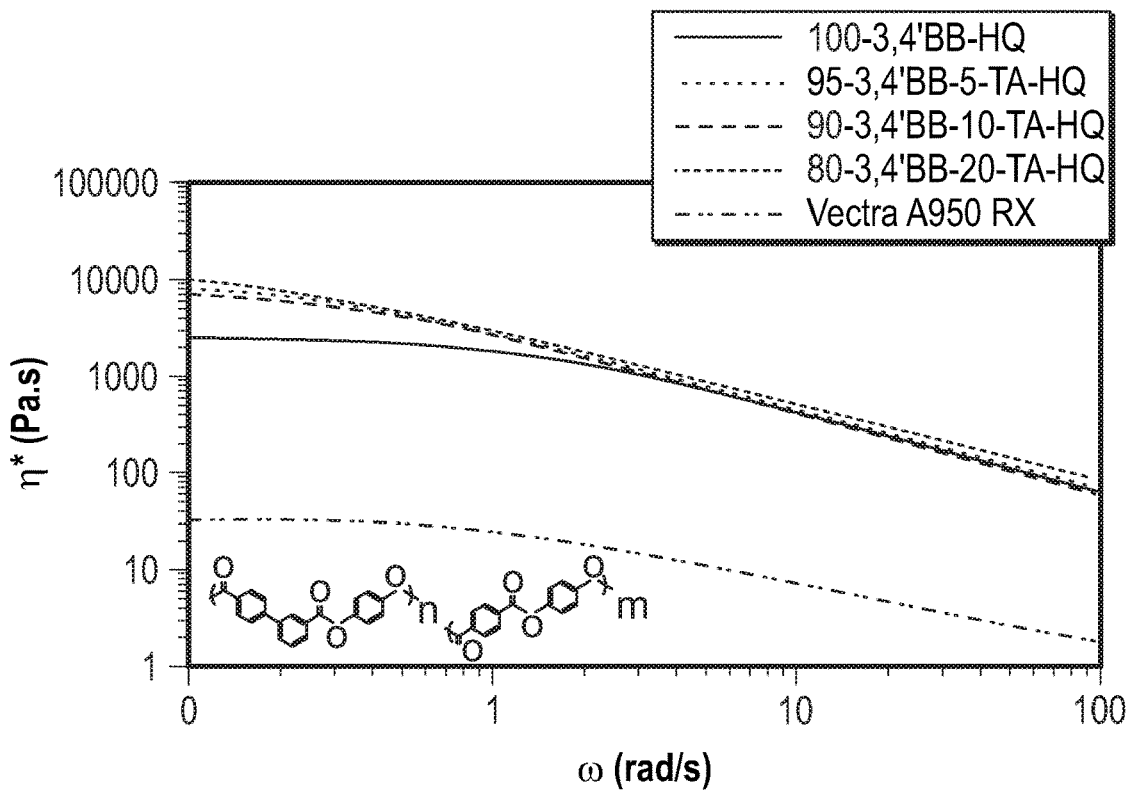
FIG. 14 shows the frequency sweep curves for the poly(hydroquinone-3,4'-bibenzoate-co-terephthalate) series by comonomer content versus temperature according to Examples 7-9 below.

Incorporation of TA into poly(HQ-3,4'BB) had a varied effect in comparison to IA, as seen in FIG. 11. Initial incorporation of TA at 5 and 10 mol % caused a slight decrease in $T_i$, which could be explained by an initial disruption of the packing and linearity. As higher levels of TA were added, a significant jump in the $T_i$ to a temperature above the limit of the DSC was seen, apparently due to an increase in the polymer linearity, e.g., poly(HQ-TA) is known to be a very crystalline polymer that cannot be processed due to its high degree of linearity and order. POM was utilized to determine the $T_i$ for the (co)polyester with 20 mol % TA by watching for the melt to become black at 370° C., as seen in FIG. 12, which is a chart of line drawing reproductions of the POM series arranged by comonomer content in columns (5, 10, and 20 mol % TA) versus temperature in rows (below $T_g$, between $T_g$ and $T_i$, and above $T_i$), in which gradient stippling and dashed lines are used to indicate the observed birefringence or loss in birefringence observed. The photographs of FIG. 12 as originally filed are reproduced in the corresponding priority US patent application. All (co)polymers exhibited marbled nematic textures, and did not exhibit any crystalline textures. Further, the DMA analysis followed closely to the observed thermal trends of DSC, as seen in FIG. 13. A decrease in $T_{flow}$ appeared to correlate with the decrease in $T_i$ of (co)polymers with 5 and 10 mol % TA, along with a drop in the plateau modulus. At 80 mol % TA incorporation, the copolymer appeared to have a further decrease in the plateau modulus and $T_{flow}$ well below $T_i$. FIG. 14 shows the rheological frequency sweep curves for the poly(HQ$_a$-TA-3,4'BB) (co)polyester series.

Examples 10-12: Synthesis of poly(hydroquinone-3,4'-bibenzoate-co-naphthalene dicarboxylate)

The (co)polyesters were prepared from equimolar amounts of hydroquinone diacetate and biphenyl 3,4'-dicarboxylic acid generally as described in Example 2 above, in which a portion of the 3,4'BB was exchanged with either 5, 10, or 20 mole percent of naphthalene dicarboxylic acid (NDA). The monomers were added into an oven-dried 100 mL round-bottom flask. A mechanical stir rod, distillation apparatus, and t-neck were attached and the reaction purged three times with nitrogen and vacuum. The reactor was lowered into a molten metal bath under constant nitrogen purge, heated to 300° C. with stirring for 0.5 h, then to 330° C. for 0.5 h, then to 360° C. for 0.5 h, and finally vacuum (0.15 mmHg) was applied at 360° C. for 0.5 h to remove any residual acetic acid and drive the reaction to completion. The resulting polymer was removed from the stir rod and used without further purification.

Figure 15:
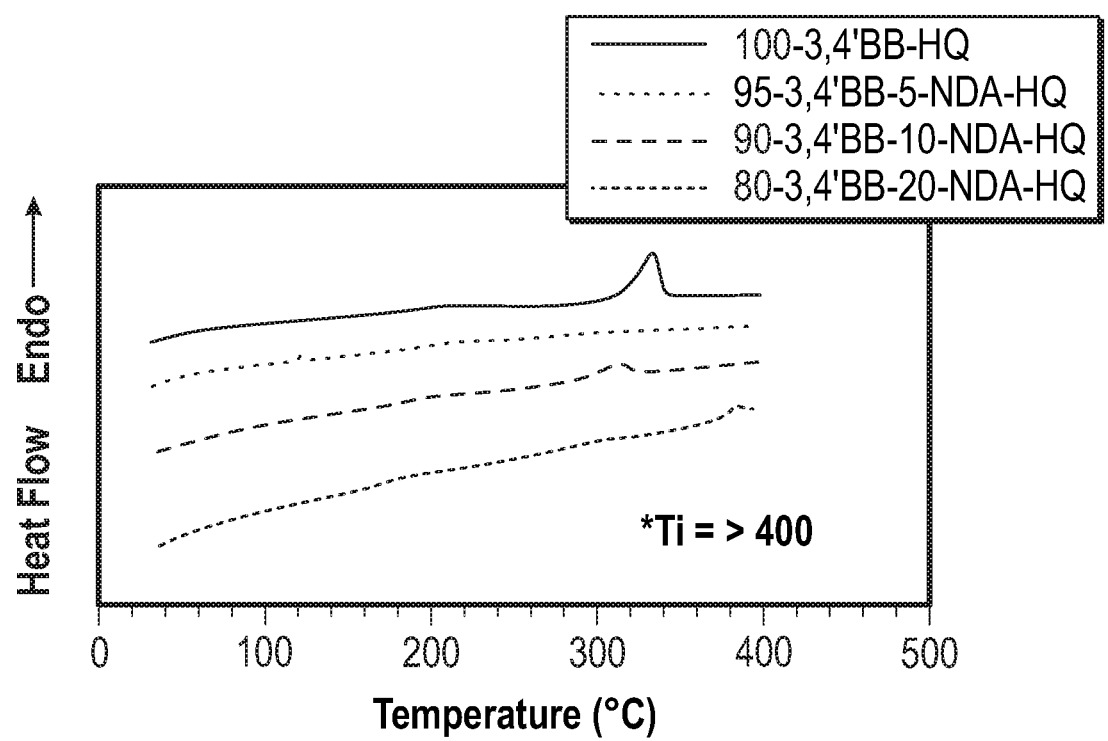
FIG. 15 shows the second heating curves from DSC of the poly(hydroquinone-3,4'-bibenzoate-co-naphthalene dicarboxylate) series according to Examples 7-9 below.
Figure 16:
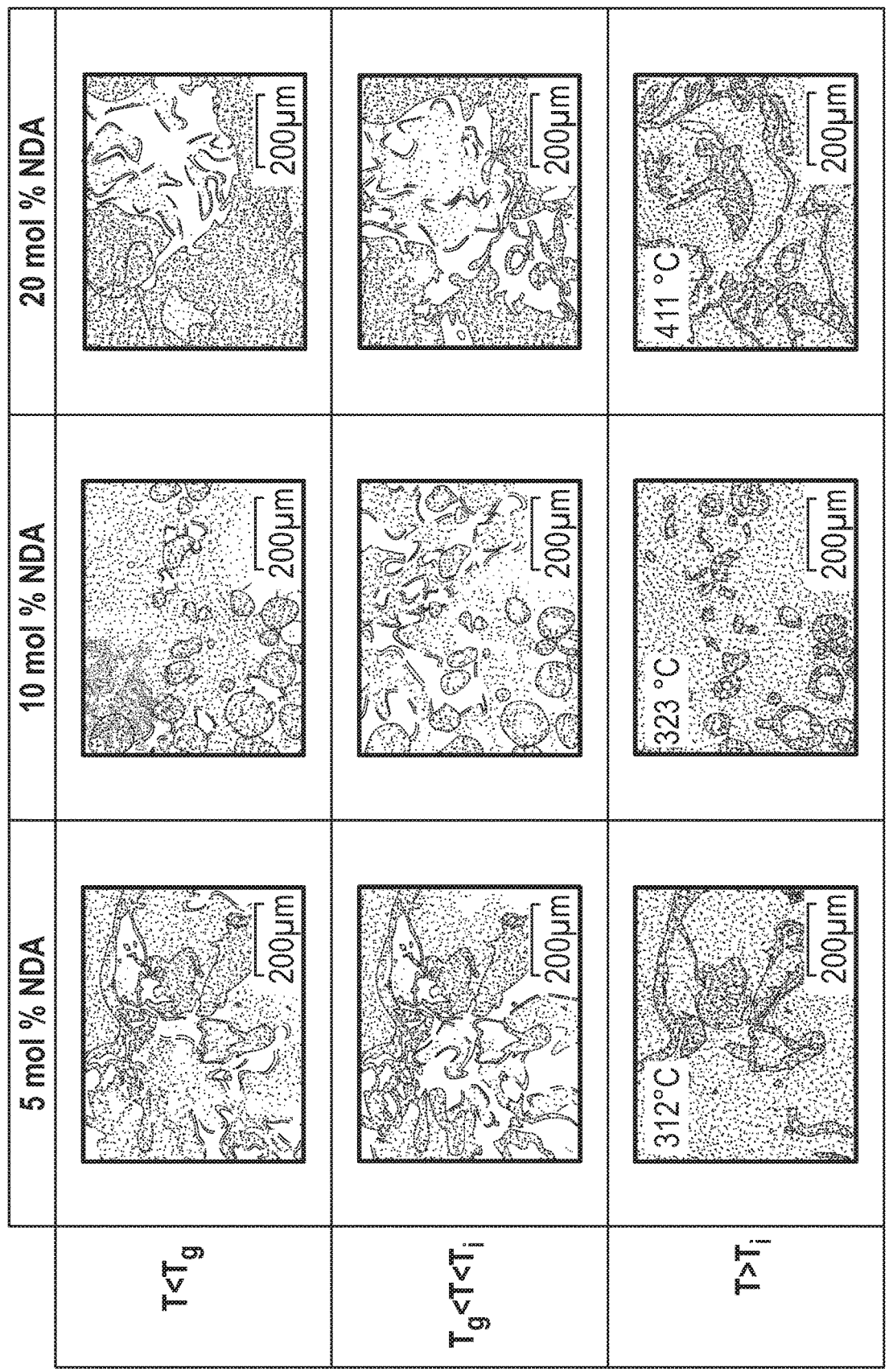
FIG. 16 is a chart of line drawing reproductions of the polarized optical microscopic photographs for the poly(hydroquinone-3,4'-bibenzoate-co-naphthalene dicarboxylate) series by comonomer content versus temperature according to Examples 10-13 below, in which gradient stippling and dashed lines are used to indicate the observed birefringence or loss in birefringence observed in the photograph of the example.
Figure 17:
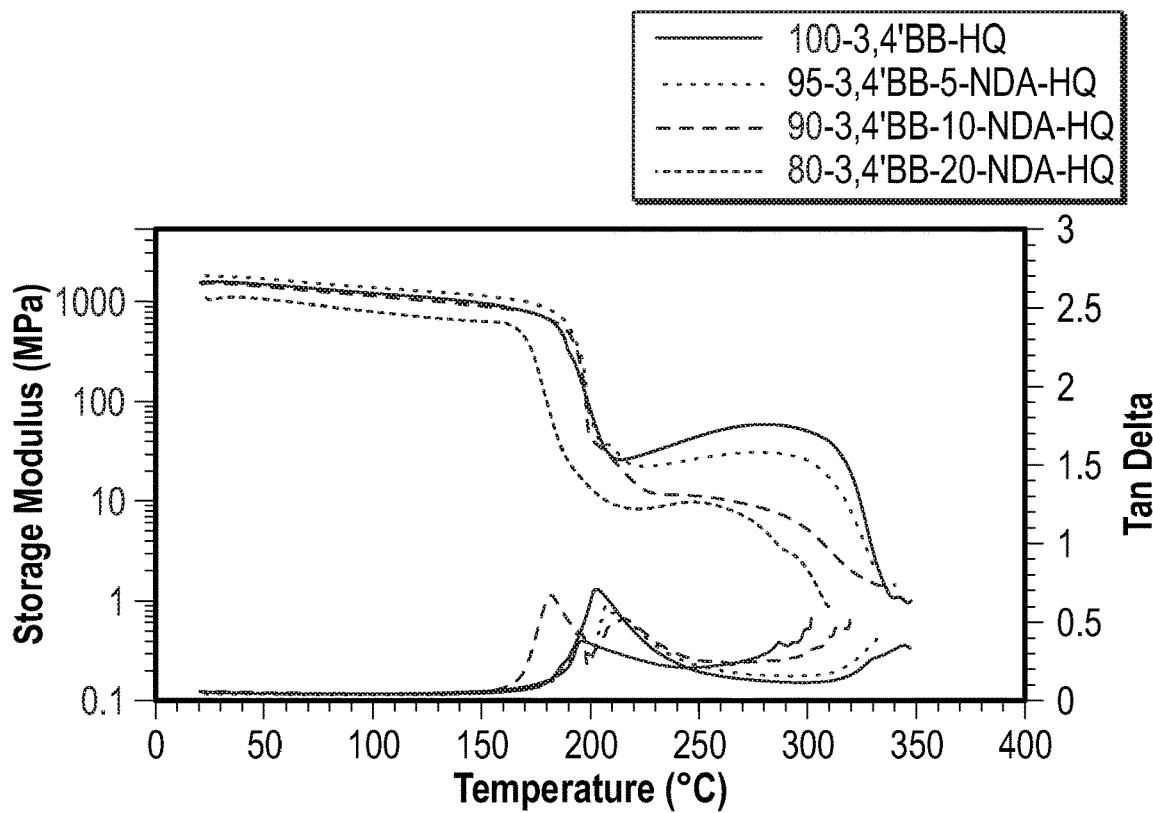
FIG. 17 shows the DMA curves for the poly(hydroquinone-3,4'-bibenzoate-co-naphthalene dicarboxylate) series according to Examples 10-13 below.
Figure 18:
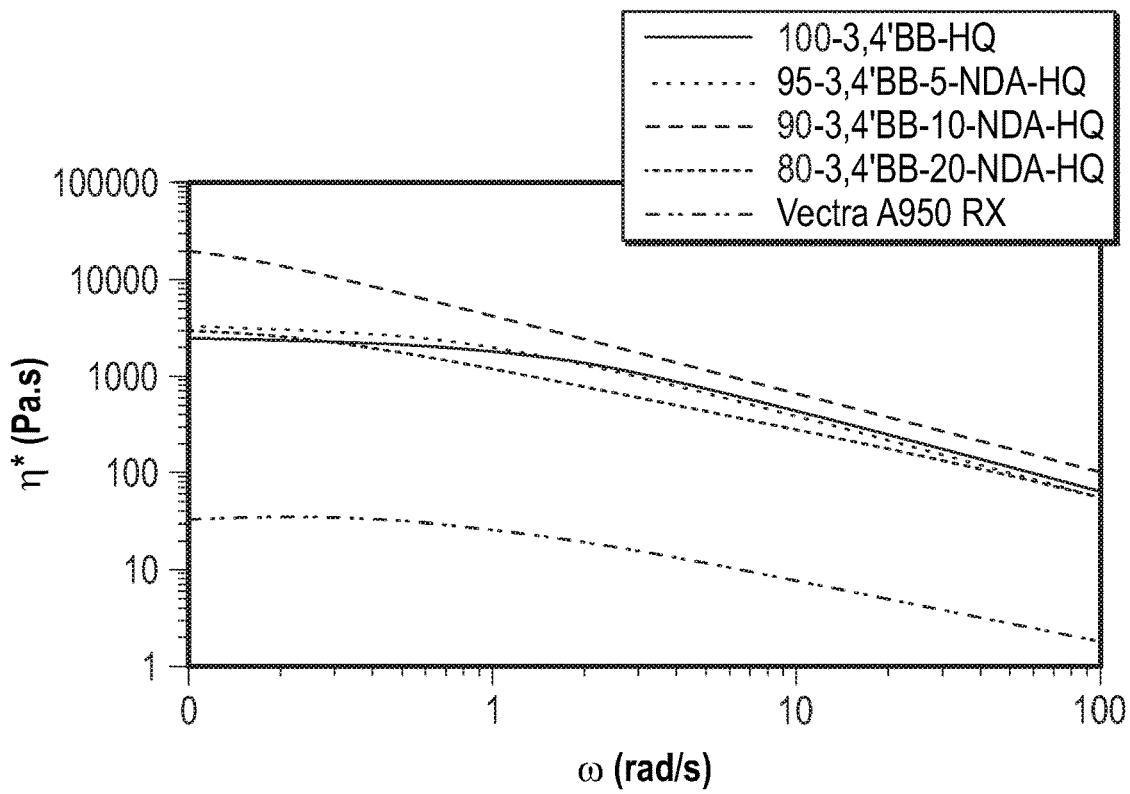
FIG. 18 shows the frequency sweep curves for the poly(hydroquinone-3,4'-bibenzoate-co-naphthalene dicarboxylate) series by comonomer content versus temperature according to Examples 10-13 below.

The fused ring of NDA appeared to have a more disruptive effect on the (co)polyester linearity at low mol % incorporation than TA, as seen in FIG. 15. At 5 mol %, no $T_i$ was observed in the second heat of the DSC scan, although at 10 mol % a $T_i$ began to reemerge as the linearity of the polymer apparently increased. At 20 mol % incorporation the NDA pushed the $T_i$ to a temperature greater than the limit of the DSC, and instead the $T_i$ was observed through optical microscopy. FIG. 16 is a chart of line drawing reproductions of the POM series arranged by comonomer content in columns (5, 10, and 20 mol % NDA) versus temperature in rows (below $T_g$, between $T_g$ and $T_i$, and above $T_i$), in which gradient stippling and dashed lines are used to indicate the observed birefringence or loss in birefringence observed As seen in FIG. 16, POM demonstrated a marbled nematic texture and the inhibition of a crystalline texture. The photographs of FIG. 16 as originally filed are reproduced in the corresponding priority US patent application. The observation of limited birefringence below the $T_g$ at 5 mol % NDA confirmed the limited liquid crystallinity of this (co)polymer observed by DSC. The DMA analysis shown in FIG. 17 demonstrated a systematic drop in plateau modulus and $T_{flow}$ as the mol % NDA was increased. This was unexpected for 10 and 20 mol % NDA, since the results for IA and TA previously seen in Examples 4-9 suggested higher levels of order and thus less of a decrease in $T_{flow}$. This may indicate that, as linearity of the polymer is increased, the nematic mesophase is aligning more and enabling higher mobility between chains allowing for flow in the nematic state. FIG. 18 shows the rheological frequency sweep curves for the poly($HQ_a$-NDA-3,4'BB) (co)polyester series.

Example 13: Synthesis of poly(hydroquinone-3,4'-bibenzoate-co-4,4'-bibenzoate)

Figure 19:
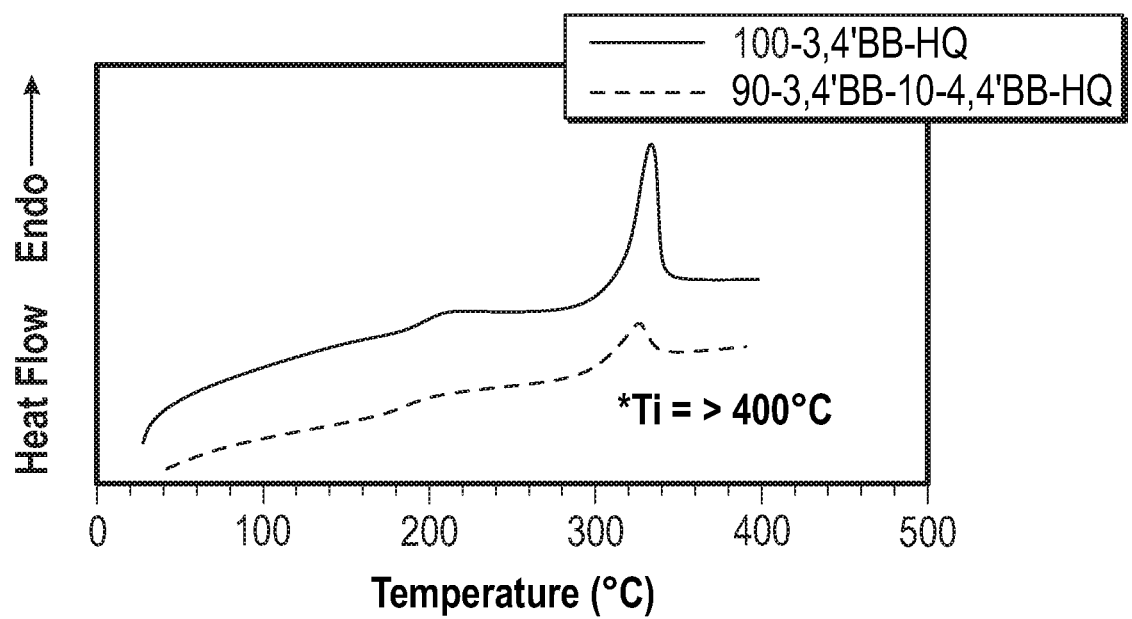
FIG. 19 shows the second heating curve from DSC of the poly(hydroquinone-3,4'-bibenzoate-co-4,4'-bibenzoate) according to Example 14 below.

The (co)polyester was prepared from equimolar amounts of hydroquinone diacetate and biphenyl 3,4'-dicarboxylic acid generally as described in Example 2 above, in which 10 mole percent of the 3,4'BB was exchanged with 10 mole percent of biphenyl 4,4'-dicarboxylic acid (4,4'BB). The monomers were added into an oven-dried 100 mL round-bottom flask. A mechanical stir rod, distillation apparatus, and t-neck were attached and the reaction purged three times with nitrogen and vacuum. The reactor was lowered into a molten metal bath under constant nitrogen purge, heated to 300° C. with stirring for 0.5 h, then to 330° C. for 0.5 h, then to 360° C. for 0.5 h, and finally vacuum (0.15 mmHg) was applied at 360° C. for 0.5 h. The resulting polymer was removed from the stir rod and used without further purification. The DSC seen in FIG. 19 demonstrated a much smaller decrease in $T_i$ for the 4,4'BB comonomer relative to the other diacid comonomers of Examples 3-12.

Selected properties of the polyesters of Examples 2-3 and the (co)polyesters of Examples 4-13 are summarized in Table 2.

TABLE 2

Properties of 3,4'BB-HQ and its (co)polyesters

| Ex. | Polyester | Tg, ° C. (DSC) | $\Delta H_f (\Delta C_p)$ W/g | $T_i^1 (T_m)$, ° C. | $\Delta H_i$ ($\Delta H_m$), J/g | Tg, ° C. (DMA) | $T_{flow}$, ° C. | η*, Pa · s |
|---|---|---|---|---|---|---|---|---|
| 2 | 3,4'-BB-HQa | 198 | (0.05) | 332 (320) | 26.7 | 203 | 315 | 251824 |
| 3 | 3,4'-BB-HQp | 184 | (0.05) | 324 (315) | 20.4 | | | 65423 |
| 4 | 95-3,4'BB-5-IA-HQ | 187 | 0.0944 | 317 | 20.5 | 199 | 304 | 2920 |
| 5 | 90-3,4'BB-10-IA-HQ | 187 | 0.114 | 305 | 16.34 | 206 | 293 | 11115 |
| 6 | 80-3,4'BB-20-IA-HQ | 198 | 0.107 | N/A | N/A | 211 | 290 | 40070 |
| 7 | 95-3,4'BB-5-TA-HQ | 189 | 0.0277 | 321 | 16.1 | 198 | 298 | 7990 |
| 8 | 90-3,4'BB-10-TA-HQ | 175 | 0.0604 | 319 | 16.1 | 196 | 293 | 7079 |
| 9 | 80-3,4'BB-20-TA-HQ | 179 | 0.0833 | 370* | N/A | 194 | 291 | 10142 |
| 10 | 95-3,4'BB-5-NDA-HQ | 199 | 0.0578 | N/A | N/A | 205 | 307 | 3331 |
| 11 | 90-3,4'BB-10-NDA-HQ | 179 | 0.0850 | 312 | 9.55 | 209 | 286 | 20968 |
| 12 | 80-3,4'BB-20-NDA-HQ[1] | 167 | 0.0430 | >400 (300) | N/A (3.40) | 181 | 269 | 3035 |
| 13 | 90-3,4'BB-10-4,4'BB-HQ | 188 | 0.0484 | 326 | 12.9 | 211 | 308 | N/A |

[1] $T_i$ determined by optical microscopy

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

What is claimed is:

1. A liquid crystalline polyester comprising:
   a dihydroxy component comprising at least about 80 mole percent of hydroquinone, based on the total moles of the dihydroxy component; and
   a diacid component comprising at least about 80 mole percent of 3,4'-biphenyl dicarboxylate, based on the total moles of the diacid component;
   wherein the polyester has a flow temperature ($T_f$) as determined by ASTM D4065 at 1 Hz below an isotropic temperature ($T_i$) determined by DSC with a heat/cool/heat cycle (second heating) at a heating rate of 10° C./min and cooling rate of 100° C./min.

2. The polyester of claim 1, further comprising a hydroxy-carboxylic acid component in an amount up to 20 mole percent, based on the total moles of the diacid component and the hydroxy-carboxylic acid component.

3. The polyester of claim 1, consisting essentially of hydroquinone and 3,4'-biphenyl dicarboxylate.

4. The polyester of claim 1, wherein the dihydroxy component consists of hydroquinone, and the diacid component consists of 3,4'-biphenyl dicarboxylate.

5. The polyester of claim 4, wherein the polyester is free of a hydroxy-carboxylic acid component.

6. The polyester of claim 1, further comprising one or more comonomers in an amount effective to modify: crystallinity as determined by ASTM D3418; heat of fusion ($\Delta H_f$) as determined by ASTM D341; glass transition temperature ($T_g$), as determined by ASTM D3418; thermal decomposition temperature ($T_d$,5%) as determined by ASTM D3850 using a temperature ramp of 10° C./min under nitrogen; the $T_f$; the $T_i$; zero shear melt viscosity ($\eta^*$) determined at 340° C. at a frequency of 0.1 radians/second, by frequency sweep on 8 mm parallel plates under nitrogen at 1% strain; or a combination thereof.

7. The polyester of claim 6, further comprising one or more of the following:
   wherein the dihydroxy component comprises one or more aromatic dihydroxy component comonomers in an amount up to 20 mole percent, based on the total moles of the dihydroxy component;
   wherein the diacid component comprises one or more aromatic diacid component comonomers in an amount up to 20 mole percent, based on the total moles of the diacid component;
   wherein the polyester comprises a hydroxy-carboxylic acid comonomer in an amount up to 20 mole percent, based on the total moles of the diacid component and the hydroxy-acid comonomer.

8. The polyester of claim 7, further comprising one or more of the following:
   wherein the one or more aromatic dihydroxy comonomers is selected from: resorcinol, 4,4-dihydroxybiphenyl, and combinations thereof;
   wherein the one or more aromatic diacid comonomers is selected from: terephthalic acid (TA), naphthalene dicarboxylic acid (NDA), 4,4'-biphenyl dicarboxylate (4,4'BB), isophthalic acid (IA), and combinations thereof;
   wherein the hydroxy-carboxylic acid comonomer is p-hydroxy benzoic acid.

9. The polyester of claim 1, wherein the $T_i$ is less than the thermal decomposition temperature ($T_{d,5\%}$) as determined by ASTM D3850 using a temperature ramp of 10° C./min under nitrogen.

10. The polyester of claim 1, wherein the polyester exhibits one or more of the following:
    a thermal decomposition temperature ($T_{d,5\%}$) as determined by ASTM D3850 using a temperature ramp of 10° C./min under nitrogen, of about 400° C. or more;
    the $T_f$ is about 350° C. or less;
    the $T_i$ is about 350° C. or less;
    a glass transition temperature ($T_g$) as determined by ASTM D3418, of about 220° C. or less;
    a zero-shear melt viscosity ($\eta^*$) determined at 340° C. at a frequency of 0.1 radians/second, by frequency sweep on 8 mm parallel plates under nitrogen at 1% strain, of at least about 50,000 Pa-s.

11. A method comprising:
    contacting a dihydroxy component comprising at least about 80 mole percent of hydroquinone or a hydroquinone diester derivative, based on the total moles of the dihydroxy component, with a diacid component comprising at least about 80 mole percent of 3,4'-biphenyl dicarboxylic acid (3,4'-BB) or an ester derivative of 3,4'-BB, based on the total moles of the diacid component, under polycondensation conditions;
    forming a polyester comprising the dihydroxy and diacid components; and
    processing the polyester in a liquid crystalline glass phase.

12. The method of claim 11, wherein the contacting is in the presence of a hydroxy-carboxylic acid component in an amount up to 20 mole percent, based on the total moles of the diacid component and the hydroxy-carboxylic acid component.

13. The method of claim 11, wherein the polyester consists essentially of hydroquinone and 3,4'-biphenyl dicarboxylate.

14. The method of claim 11, wherein the dihydroxy component consists of hydroquinone, and the diacid component consists of 3,4'-biphenyl dicarboxylate.

15. The method of claim 14, wherein the polyester is free of a hydroxy-carboxylic acid component.

16. The method of claim 11, wherein the dihydroxy component comprises the hydroquinone diester derivative comprising the reaction product of a hydroquinone with a carboxylic acid comprising from 1 to 6 carbon atoms or an anhydride comprising from 2 to 14 carbon atoms, to form the hydroquinone diester derivative.

17. The method of claim 16, wherein the hydroquinone diester derivative is hydroquinone dipivalate.

18. The method of claim 11, wherein the diacid component comprises 3,4'-BB in the free acid form.

19. The method of claim 11, wherein the polyester further comprises one or more comonomers in an amount effective to modify: crystallinity as determined by ASTM D3418; heat of fusion ($\Delta H_f$) as determined by ASTM D341; glass transition temperature ($T_g$), as determined by ASTM D3418; thermal decomposition temperature ($T_d$,5%) as determined by ASTM D3850 using a temperature ramp of 10° C./min under nitrogen; the $T_f$; the $T_i$; zero shear melt viscosity ($\eta^*$) determined at 340° C. at a frequency of 0.1 radians/second, by frequency sweep on 8 mm parallel plates under nitrogen at 1% strain; or a combination thereof.

20. The method of claim 19, further comprising one or more of:
- wherein the dihydroxy component comprises one or more aromatic dihydroxy component comonomers in an amount up to 20 mole percent, based on the total moles of the dihydroxy component;
- wherein the diacid component comprises one or more aromatic diacid component comonomers in an amount up to 20 mole percent, based on the total moles of the diacid component;
- wherein the polyester comprises a hydroxy-carboxylic acid comonomer in an amount up to 20 mole percent, based on the total moles of the diacid component and the hydroxy-acid comonomer.

21. The method of claim 20, further comprising one or more of the following:
- wherein the one or more aromatic dihydroxy comonomers is selected from: resorcinol, 4,4-dihydroxybiphenyl, and combinations thereof;
- wherein the one or more aromatic diacid comonomers is selected from: terephthalic acid (TA), naphthalene dicarboxylic acid (NDA), 4,4'-biphenyl dicarboxylate (4,4'BB), isophthalic acid (IA), and combinations thereof;
- wherein the hydroxy-carboxylic acid comonomer is p-hydroxy benzoic acid.

22. The method of claim 11, wherein the polyester formation is by acidolysis polycondensation.

23. The method of claim 22, further comprising hydrolyzing a 3,4'-bibenzoate diester to form the 3,4'-BB free acid.

24. The method of claim 22, further comprising esterifying hydroquinone with an ester-forming carboxylic acid, carboxylic acid anhydride, or combination thereof.

25. The method claim 24, wherein the carboxylic acid or anhydride is selected from acetic acid, acetic anhydride, pivalic acid, pivalic anhydride, or a combination thereof.

26. The method of claim 11, further comprising forming the polyester into a shaped article.

27. The method of claim 26, wherein the shaped article comprises a fiber, a nonwoven fabric, a film, or a molded article.

* * * * *